(12) United States Patent
Yoshitake

(10) Patent No.: US 6,658,495 B1
(45) Date of Patent: Dec. 2, 2003

(54) DATA COMMUNICATION APPARATUS AND METHOD FOR TRANSMITTING PREDETERMINED ADDRESS FOR OPENING COMMUNICATION PORTS

(75) Inventor: Akira Yoshitake, Kanagawa (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 09/254,013

(22) PCT Filed: Jul. 1, 1998

(86) PCT No.: PCT/JP98/02966

§ 371 (c)(1),
(2), (4) Date: Apr. 22, 1999

(87) PCT Pub. No.: WO99/01962

PCT Pub. Date: Jan. 14, 1999

(30) Foreign Application Priority Data

Jul. 1, 1997 (JP) .......................................... P09-175499

(51) Int. Cl.[7] ............................ G06F 3/00; G06F 13/00; G06F 15/16

(52) U.S. Cl. ................................. 710/5; 710/7; 710/20; 710/33; 709/250; 709/251

(58) Field of Search ............................. 710/2, 5, 7, 36, 710/20, 33; 370/401, 468; 709/223, 250, 251

(56) References Cited

U.S. PATENT DOCUMENTS

| | | | | |
|---|---|---|---|---|
| 4,852,089 A | * | 7/1989 | Berry et al. | 370/468 |
| 5,146,565 A | * | 9/1992 | Blanck et al. | 710/36 |
| 5,257,353 A | * | 10/1993 | Blanck et al. | 710/36 |
| 5,267,235 A | * | 11/1993 | Thacker | 370/396 |
| 5,764,895 A | * | 6/1998 | Chung | 709/250 |
| 5,857,075 A | * | 1/1999 | Chung | 709/223 |
| 5,884,040 A | * | 3/1999 | Chung | 709/227 |
| 5,940,392 A | * | 8/1999 | Lo et al. | 370/392 |
| 6,301,256 B1 | * | 10/2001 | Vasa | 370/401 |

FOREIGN PATENT DOCUMENTS

| | | | | |
|---|---|---|---|---|
| JP | 57-148449 | | 9/1982 | ........... H04L/11/18 |
| JP | 62-109458 | | 5/1987 | ........... H04L/25/52 |
| JP | 402301244 A | * | 12/1990 | |

\* cited by examiner

Primary Examiner—Thomas Lee
Assistant Examiner—Chun Cao
(74) Attorney, Agent, or Firm—Bell, Boyd & Lloyd, LLC

(57) ABSTRACT

A server transmits an open command which orders to open ports when data is transmitted to terminals. The open command is formed with a plurality of bits so as to have flags corresponding to each port of the terminals. Among a plurality of the bits, only the bits corresponding to the ports to be opened are set to be, for example, 1 and the rest is set to be, for example, 0. In each of the terminals, each of the receivers receives the open command, and judges whether the bits corresponding itself in the open command is, for example, 1 or not. When the bit is 1, the terminal opens the port.

17 Claims, 21 Drawing Sheets

FIG. 2

| 31 ~ 24 | 23 ~ 16 | 15 ~ 8 | 7 ~ 0 (bit) |
|---|---|---|---|
| K28.5 | D17.4 | Dxx.x | D31.7 |

The First Transmission Word

| 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 |
|---|---|---|---|---|---|---|---|---|---|---|---|---|---|---|---|---|---|---|---|---|---|---|---|---|---|---|---|---|---|---|---|

The Second Transmission Word

| 32 | 33 | 34 | 35 | 36 | 37 | 38 | 39 | 40 | 41 | 42 | 43 | 44 | 45 | 46 | 47 | 48 | 49 | 50 | 51 | 52 | 53 | 54 | 55 | 56 | 57 | 58 | 59 | 60 | 61 | 62 | 63 |
|---|---|---|---|---|---|---|---|---|---|---|---|---|---|---|---|---|---|---|---|---|---|---|---|---|---|---|---|---|---|---|---|

The Third Transmission Word

| 64 | 65 | 66 | 67 | 68 | 69 | 70 | 71 | 72 | 73 | 74 | 75 | 76 | 77 | 78 | 79 | 80 | 81 | 82 | 83 | 84 | 85 | 86 | 87 | 88 | 89 | 90 | 91 | 92 | 93 | 94 | 95 |
|---|---|---|---|---|---|---|---|---|---|---|---|---|---|---|---|---|---|---|---|---|---|---|---|---|---|---|---|---|---|---|---|

The Fourth Transmission Word

| 96 | 97 | 98 | 99 | 100 | 101 | 102 | 103 | 104 | 105 | 106 | 107 | 108 | 109 | 110 | 111 | 112 | 113 | 114 | 115 | 116 | 117 | 118 | 119 | 120 | 121 | 122 | 123 | 124 | 125 | 126 | Reserved |
|---|---|---|---|---|---|---|---|---|---|---|---|---|---|---|---|---|---|---|---|---|---|---|---|---|---|---|---|---|---|---|---|

The Fifth Transmission Word

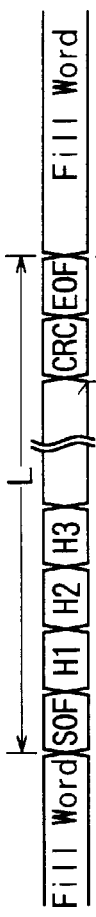
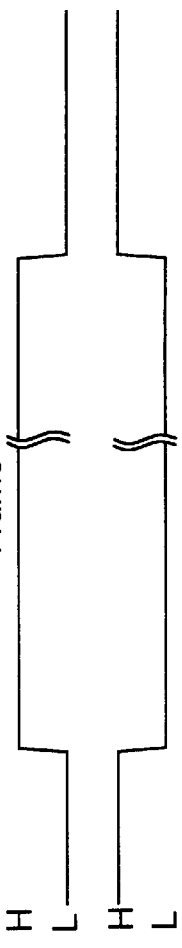
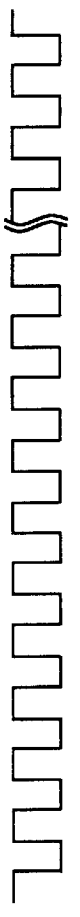
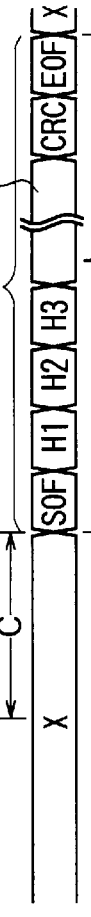
FIG.7 (A) Receiver Clock
FIG.7 (B) Data
FIG.7 (C) Frame Data Read Signal
FIG.7 (D) Fill Word Read Signal
FIG.7 (E) Transmitter Clock
FIG.7 (F) Buffer Memory Output
FIG.7 (G) Fill Word Register Output
FIG.7 (H) Selection Signal
FIG.7 (I) Selector Output Layout of Fibre Channel Port Point – To – Point Topology Arbitrated Loop Topology Operation Clock of Arbitrated Loop Topology Structure of OPNyr orderset of Related Art

DATA COMMUNICATION APPARATUS AND METHOD FOR TRANSMITTING PREDETERMINED ADDRESS FOR OPENING COMMUNICATION PORTS

TECHNICAL FIELD

The present invention relates to a data communication apparatus and a method for performing data communications effectively, and a data recording/reproducing apparatus and a method.

BACKGROUND ART

As one of the communication specification, for example, there is a fibre channel developed by ANSI (American National Standards Institute). It is spelled 'fibre' in the fibre channel different from 'fiber' as in so-called optical fiber.

An apparatus performing communications via the fibre channel is called a node and, each node performs transmitting and receiving data via a port (communication port). In the fibre channel, cables connecting between the ports are not especially limited. For example, optical fibers (fiber cable), coaxial cables (copper cable) or twisted pair cables may be used.

Further, the fibre channel is one of serial communication methods, and the transmission speed is faster and the transmission distance is longer comparing with other serial communication methods. Further, it is assumed that the fibre channel may be applied in the data transmission between various kinds of apparatuses hereafter since TCP/IP (Transmission Control Protocol/Internet Protocol) which has recently grown very rapidly and other various kinds of protocols can be used in addition and, further, its usage can be broadly extended to be connected.

Here, in the fibre channel at the moment, 128 Mbps (bit per second), 256 Mdps, 512 Mbps, -Gbps are defined as the transmission speed and, in the near future, extending it to 2 Gbps and 4 Gbps is expected. Further, the transmission distance varies depending on the transmission speed, however, it is defined as about 0.175 km to 10 km in the fiber cable, about 10 m to 100 m in the copper cable and about 50 m to 100 m in the twisted pair cable respectively.

Further, a port of the fibre channel as shown in FIG. 15, for example, has a transmitter which transmits information and a receiver which receives information respectively. Further, as substantial connecting forms of the fibre channel, as being classified broadly there is a point-to-point topology as shown in FIG. 16 and an arbitrated loop topology as shown in FIG. 17.

In the point-to-point topology as shown in FIG.16, one of the transmitter is connected to the other receiver, and one of the receiver is connected to the other transmitter using only two ports. In the topology, the transmission speed, the transmission medium (cable connecting the both) and the protocol of the two ports and so on are required to be the same.

As shown in FIG.17, the arbitrated loop topology is formed with three or more ports, and a transmitter of one port is connected to a receiver of the other port so that a ring network is formed.

FIG. 17 shows an arbitrated loop topology formed with four ports A to D. Here, a transmitter of the port A and a receiver of the port B, a transmitter of the port B and a receiver of the port C, a transmitter of the port C and a receiver of the port D, and a transmitter of the port D and a receiver of the port A are connected respectively. In the arbitrated loop topology, the up to 127 ports can be connected so far.

In the point-to-point topology, transmitting and receiving data are performed subjecting to the other port, other than the transferring port itself since it is formed with two ports. However, in the arbitrated loop topology, there may be a case where transmitting and receiving data are performed via the port which is not the subject of the transmission and reception of the data.

That is, in FIG. 17, for example, when data is transmitted from the port A to the port C, data addressed to the port C is transmitted from the transmitter of the port A to the receiver of the port B. When the port B receives data addressed to the port C by the receiver, then, the data is transmitted from the transmitter of the port B to the receiver of the port C. In the port C, data addressed to the port C itself from the port A is received as described above. In this case, the port B functions as so-called repeater which only transmits data as it is received by the receiver from the transmitter.

By the way, in the specification of the fibre channel, a jitter (deviation) of ±100 ppm (parts per million; 1 ppm=1/100 million) is allowed in clocks of the transmitter of each port. Further, in the fibre channel, receiving data is performed synchronizing with the clock obtained from data so that data can be received reliably by the receiver even if there is a jitter in the clock of the transmitter as mentioned.

That is, a receiver of one port operates synchronizing with the clock of a transmitter of the other port being connected. Accordingly, for example, as shown in FIG. 18, the transmitter of the port A and the receiver of the port B, the transmitter of the port B and the receiver of the port C, the transmitter of the port C and the receiver of the port D and the transmitter of the port D and the receiver of the port A are synchronized with the identical clocks respectively.

Here, in the following description, an operation clock of the transmitter or the receiver forming the same port is called a transmitter clock or a receiver clock respectively where appropriate. The receiver clock is identical to the transmitter clock of the transmitter of other port connected to the receiver.

As described above, a receiver of one port operates synchronizing with the transmitter clock of the transmitter of the other port connected to the receiver. In one port, there is a deviation of 200 ppm in maximum between the transmitter clock and the receiver clock since a jitter of ±100 ppm is allowed in the transmitter clock.

In FIG. 19, in regard to a standard clock, a clock with a deviation of 100 ppm (FIG. 19(A); transmitter clock or receiver clock) and a clock with a deviation of −100 ppm (FIG. 19(B); receiver clock or transmitter clock) are shown. Accordingly, a deviation of 200 ppm in maximum occurs in the two clocks. Further, 1 clock of skew (clock skew) per 5000 clocks occurs between the two clocks having the deviation of 200 ppm.

On the other hand, in the arbitrated loop topology, the port transmitting data is required to obtain the right to use a bus (arbitrated loop) before transmitting data when transmitting data from a port to the other port. The competition to obtain the right to use the bus is called arbitration.

The port transmitting data is required to perform transmission of data after obtaining the right to use the bus by arbitration and, further, opening the port to which data is transmitted.

In the fibre channel, as a command to open the port connected in the arbitrated loop topology, OPNyx, OPNyy, OPNfr, OPNyr and so on, called order set are defined.

Here, OPNyx is used in a full duplex and OPNyy is used in a half duplex respectively. Further, OPNfr is used when opening all the ports forming the arbitrated loop topology and OPNyr is used when opening a plurality of ports among the all respectively.

FIG. 20 shows a format of the order set OPNyr, defined in the fibre channel.

The order set OPNyr, is formed with 1 transmission word (TW) as shown in FIG. 20. Here, 1 transmission word is a data volume transmitted and received in 1 clock in the fibre channel and is 4 bytes (32 bits) so far.

In the fibre channel, a 8B/10B converted data is transmitted and received for decreasing transmission errors. In the first byte (the 31st bit to the 24th bit) of the order set OPNyr, a special code called K28.5 which is a code being 8B/10B converted is allocated. The special code is used to obtain word synchronism when reproducing a parallel data from a serial data.

In the second byte from the forefront (the 23rd bit to the 16th bit), a special code called D17.4 which is a code being 8B/10B converted is allocated. This shows that the order set is the order set of OPNyr. In the third byte (the 15th bit to the 8th bit), a port address AL_PD of the port to be opened is allocated. In the fourth byte (the last 1 bit), (the 7th bit to the 0th bit), a special code called D31.7 which is a code being 8B/10B converted is allocated. This means to open a plurality of ports (there are still ports to be opened).

In the fibre channel, transmitting and receiving data called frame is performed other than the order set described above. In the fibre channel, transmission and reception of data are performed by the frame unit.

FIG. 21 shows a configuration of the frame in the fibre channel.

The frame is formed with, from the forefront, SOF (Start of Frame), a frame header, a data field, CRC (Cycle Redundancy Check), and EOF (End of Frame) being allocated in this order.

Here, the SOF is a code showing a start of the frame and being formed with 4 bytes. The frame header is formed with 24 bytes and a port ID (ID for specifying port) of the port transferring the frame, the port ID of the receiving port, and the information for specifying a protocol used in the transmission and so on are allocated. The data field is formed with an optional header of 64 bytes in maximum, and a payload of 2048 bytes in maximum. Accordingly, the data field is formed with 2112 (=64+2048) bytes in maximum. The substantial data which is to be transmitted originally is allocated in the payload. The CRC is an error correction code signal and formed with 4 bytes. The EOF is a code showing an end of the frame and formed with 4 bytes.

The transmission and reception of the frame are performed in the fibre channel, however, in a case where the transmission and reception are not performed, basically, transmission and reception of data called fill words are performed since a receiver of a port operates synchronizing with the clock of the transmitter of the other port being connected.

Here, as the fill words, for example, data called an idle or ARB is defined. The idle is to bury between the order sets or between the frames, and the ARB is to obtain the right to use the bus (network). Accordingly, in a case where transmitting and receiving the order set or the frame are not performed, transmitting and receiving the idle are performed basically.

By the way, as described above, when the port functions as a repeater, that is, when transmitting data as it is received by the receiver from the transmitter, the receiver clock and the transmitter clock are not the same and have a deviation of 200 ppm in maximum (a jitter of ±100 ppm in each port is allowed, which leads to a maximum of 200 ppm). As a result, the port functioning as the repeater may not be able to transmit and receive the normal data, when transmitting the data received synchronizing with the receiver clock, is performed synchronizing with the transmitter clock continuously for a long period of time.

That is, in the fibre channel, transmission of 1 transmission word per 1 clock is performed as described above. Accordingly, a skew of 1 clock per 5000 clocks occurs between the receiver clock and the transmitter clock, in a case there is a deviation of 200 ppm, for example. As a result, simply, transmitting and receiving 1 transmission word will be failed in 5000 clocks.

To prevent a failure of transmitting and receiving data resulted from such a clock skew (deviation of a clock), a fill word (especially an idle) is inserted before and after the frame and the order set. Here, in the fibre channel, it is defined to perform transmission of the fill words of at least 6 transmission words after transmitting the frame or the order set. Further, to prevent the failure of transmitting and receiving data resulted from the clock skew, the payload in the frame is limited to 2048 bytes currently.

Limitation in bytes of payload is not such an issue when transmitting data of a small amount, however, when transmitting data of a large amount such as picture data, a transmission efficiency gets worse since data is transmitted being divided by a unit of 2048 bytes and the frame is formed with an over head being taken into consideration.

Further, when transmitting data to a plurality of ports, each port is required to be open.

The transmission of OPNyr order set, as mentioned earlier, is required to be performed the same times as the number of the port to open a plurality of ports. Further, the fill words of at least 6 transmission words are needed to be inserted every time OPNyr order set is transmitted.

Accordingly, for example, in a case where the arbitrated loop topology is formed with 127 ports, when 125 ports among them, for example, are opened, at least, 1 transmission word of OPNyr order set and 6 transmission words of fill words, amounting to 7 transmission words are required to be transmitted 125 times. That is, the data of at least 875 (=7×125) transmission words is required to be transmitted and extremely long time is to be spent.

Further, as a result of spending a long time for opening the port, the transmission efficiency becomes worse.

The present invention is designed to overcome the foregoing problems. It is an object of the invention to provide a data communication apparatus and a method, and a data recording/reproducing apparatus and a method in which improvements of the transmission efficiency of data can be obtained.

Disclosure of Invention

A data communication apparatus according to the invention transmits data to a plurality of communication ports after opening each of a plurality of the communication ports. The data communication apparatus comprises transmitting means for providing an address region showing address corresponding to a plurality of the communication ports respectively in a command for opening the communication ports and, for transmitting the command to a plurality of the communication ports with the address of the communication ports which are to be opened being a predetermined value. The communication ports are opened by the command transmitted from the transmitting means and the data is transmitted to the communication ports being opened.

In the data communication apparatus, by the transmitting means, an address region showing address corresponding to a plurality of the communication ports respectively is provided in a command for opening the communication ports and, the command is transmitted to a plurality of the communication ports with the address of the communication ports which are to be opened being a predetermined value. The communication ports are opened by the command transmitted from the transmitting means and the data is transmitted to the communication ports being opened.

Another data communication apparatus according to the invention comprises receiving means for receiving data which has been transmitted, transmitting means for transmitting data, first clock generating means for generating a first clock, second clock generating means for generating a second clock, storing means for storing data received by the receiving means, and control means for controlling the storing means to store the data received by the receiving means is stored in the storing means synchronizing with the first clock generated by the first clock generating means and, to read out the data stored in the storing means synchronizing with the second clock generated by the second clock generating means.

In the data communication apparatus, the storing means is controlled by the control means and the data received by the receiving means is stored in the storing means synchronizing with the first clock generated by the first clock generating means and, at the same time, data stored in the storing means is read out synchronizing with the second clock generated by the second clock generating means.

A data recording/reproducing apparatus according to the invention comprises a non-linear accessible recording means, input/output processing means for processing data so that at least one of recording and reproducing of data to the recording medium is performed, and communication means for receiving the transmitted data and transmitting data. After having communication means of other recording/reproducing apparatus being opened, the data recording/reproducing apparatus transmits data to the opened communication means of the other recording/reproducing apparatus. The communication means comprises the transmitting means for providing an address region showing address corresponding to each communication means of other recording/reproducing apparatus in a command for opening communication means of other recording/reproducing apparatus, and for transmitting the command to communication means of the other recording/reproducing apparatus with the address of the communication means of the other recording/reproducing apparatus which is to be opened being a predetermined value. Communication means of other recording/reproducing apparatus is opened by the command transmitted from the transmitting means, and data is transmitted to the opened communication means of other recording/reproducing apparatus.

In the data recording/reproducing apparatus, an address region for showing the address corresponding to each communication means of the other recording/reproducing apparatus is provided in a command for opening the communication means of the other recording/reproducing apparatus by the transmitting means of the communication means and, the command is transmitted to the transmitting means of the other recording/reproducing apparatus with the address of the transmitting means of the other recording/reproducing apparatus which is to be opened being a predetermined value. Further, the communication means of the other recording/reproducing apparatus is opened by the command transmitted from the transmitting means and, data is transmitted to the communication means of other recording/reproducing apparatus being opened.

Another recording/reproducing apparatus according to the invention comprises a non-linear accessible recording medium, input/output processing means for processing data so that data is recorded in the recording medium, and for processing the data so that the data is reproduced, communication means having receiving means for receiving data transmitted and transmitting means for transmitting data, first clock generating means for generating the first clock, second clock generating means for generating the second clock, storing means for storing data received by the receiving means, and control means for controlling the storing means to store data received by the receiving means in the storing means synchronizing with the first clock generated by the first clock generating means and for controlling the storing means to read out data stored in the storing means synchronizing with the second clock generated by the second clock generating means.

In the recording/reproducing apparatus, the storing means is controlled by the control means and data received by the receiving means is stored synchronizing with the first clock generated by the first clock generating means and, the data stored in the storing means is read out synchronizing with the second clock generated by the second clock generating means.

A data communication method according to the invention, after having a plurality of communication ports being opened respectively, transmits data to a plurality of communication port. In the data communication method includes a first step of providing an address region for showing address corresponding to each of a plurality of communication ports in a command for opening the communication port, and of transmitting the command to a plurality of communication ports with the address of the communication port which is to be opened being a predetermined value. Further, the data communication method includes a second step of opening the communication port by the command which is transmitted in the first step, and of transmitting data to the communication port which is opened.

In the data communication method, an address region for showing the address corresponding to each of a plurality of communication ports is provided in a command for opening the communication ports and, at the same time, the command is transmitted to a plurality of ports with the address of the communication port which is to be opened being a predetermined value. Further, the communication port is opened by the transmitted command and data is transmitted to the communication port being opened.

Another data communication method according to the invention, the data formed with a first data and a second data which is transmitted when the first data is not transmitted is received by the receiving means and, transmitted by the transmitting means. The data communication method includes a step of storing the first data in the first storing means synchronizing with the first clock, and reading out the first data stored in the first storing means from the first storing means synchronizing with the second clock.

In the data communication method, the first data is stored in the first storing means synchronizing with the first clock, and the first data stored in the first storing means is read out from the first storing means synchronizing with the second clock.

A data recording/reproducing method according to the invention transmits data to the opened communication means of the other recording/reproducing apparatus and records and reproduces data to/from recording medium of the other recording/reproducing apparatus after having the communication means of the other recording/reproducing apparatus being opened, in a data recording/reproducing apparatus comprising a non-linear accessible medium, input/output processing means for processing the data so that at least one of recording and reproducing of data to the recording medium is performed and communication means for receiving the data transmitted and transmitting the data. The data recording/reproducing method includes a first step in which an address region showing address corresponding to each communication means of the other recording/reproducing apparatus is provided in a command which opens communication means of the other recording/reproducing apparatus, and the command is transmitted to communication means of the other recording/reproducing apparatus with the address of the communication means of the other recording/reproducing apparatus which is to be opened being predetermined value. Further, it includes a second step in which communication means of the other recording/reproducing apparatus is opened by the command transmitted in the first step, and the data is transmitted to communication means of the other recording/reproducing apparatus which is opened.

In the data recording/reproducing method, the address region for showing the address corresponding to a plurality of ports respectively is provided in the command for opening the communication means of the other recording/reproducing apparatus and, the command is transmitted to a plurality of the communication means of the other recording/reproducing apparatus with the address of the communication port which is to be open being a predetermined value. Further, communication means of another recording/reproducing apparatus is opened by the command transmitted and, the data is transmitted to the communication means of the other recording/reproducing apparatus which is opened.

Another data recording/reproducing method according to the invention performs recording and reproducing data formed with the first data and the second data which is transmitted when the first data is not transmitted in the apparatus. The apparatus comprises receiving means for receiving transmitted data, transmitting means for transmitting data to be transmitted, storing means for storing data received by the receiving means, and input/output processing means for processing the data so as to record data in a non-linear accessible recording medium and reproduce data recorded in the recording medium. The recording/reproducing method includes a step of storing the first data in the storing means among data received by the receiving means synchronizing with the first clock, and of reading out the first data stored in the storing means from the storing means synchronizing with the second clock.

In the recording/reproducing method, the first data among data received by receiving means is stored in storing means synchronizing with the first clock and the first data stored in the storing means is read out from the storing means.

Other objects, characteristics and advantages of the invention will become sufficiently evident with the following description.

BRIEF DESCRIPTION OF THE DRAWINGS

FIG. 2 is a description chart showing an example of a format of an open command.

FIG. 7(A) to FIG. 7(I) are description charts for describing an operation of a clock-skew obsorbing apparatus in the port shown in FIG. 6.

BEST MODE FOR CARRYING OUT OF THE INVENTION

Preferred embodiments of the invention will be described in the followings.

Figure 1:
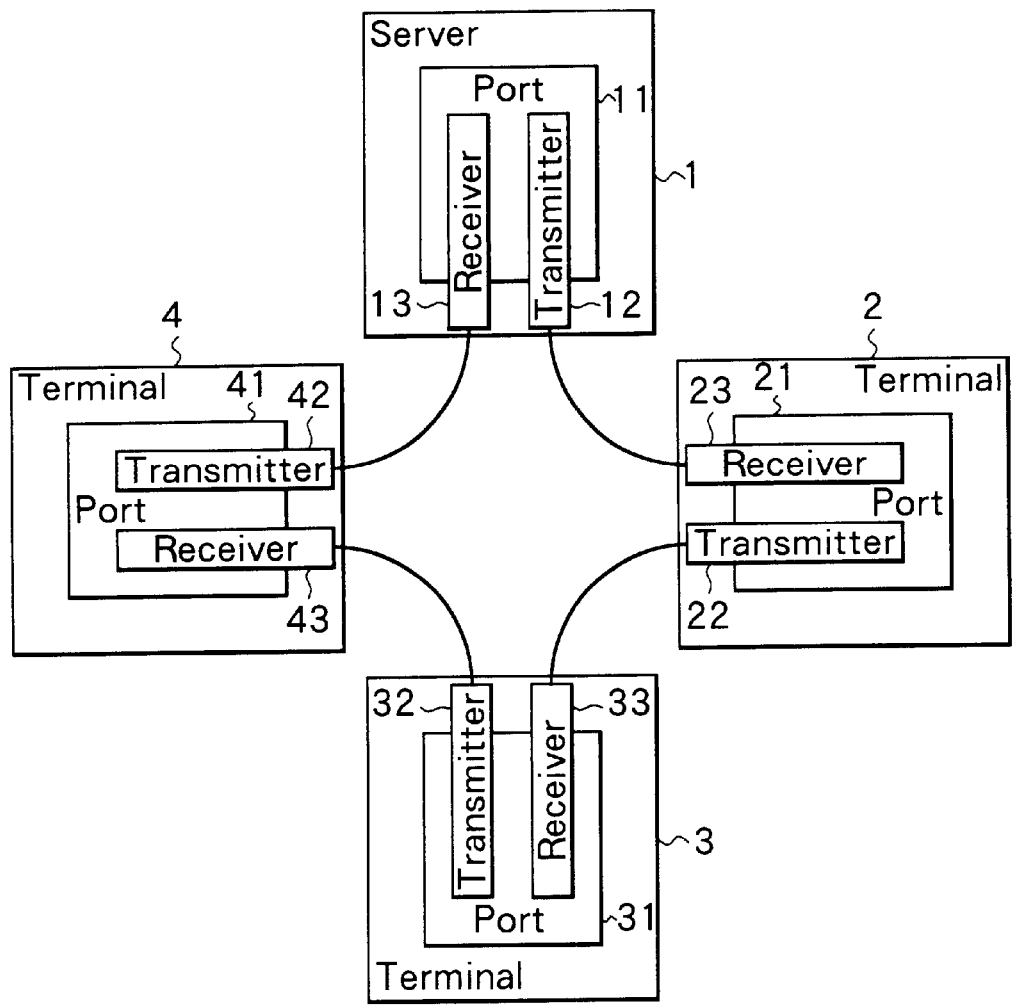
FIG. 1 is a block diagram showing a structural example of a network system to which the invention is applied.

FIG.1 shows a structural example of a network system (system refers to a plurality of apparatuses being logically collected, apparatus of each construction does not necessarily be in a same body) to which a communication apparatus and a data recording/reproducing apparatus according to an embodiment of the invention are applied.

In the embodiment, for example, a network system as LAN (Local Area Network) is formed by connecting a server 1 and three terminals 2 to 4.

That is, the server 1 has a port 11 for operating communication control with a fibre channel being a base. The port 11 comprises a transmitter 12 for transmitting data and a receiver 13 for receiving data.

Further, the server 1 comprises, as a server 111 which is to be described later with reference to FIG. 11, for example, a recording medium such as HD (Hard Disk) which is non-linear accessible, input/output processing means which processes data inputted to the recording medium so as to operate at least either recording or reproducing data, and time-slot generating means which generates a designated time-slot. In such a case, the input/output processing means processes inputted data and have data recorded in the recording medium and, at the same time, have data recorded in the recording medium reproduced in the allocated time-slot supplied from the time-slot generating means. The server 1 comprising a recording medium which is non-linear accessible as described, corresponds to a data recording/reproducing apparatus of the invention.

The terminals 2 to 4 each have ports 21, 31 and 41 formed like the port 1. That is, the ports 21, 31 and 41 each have transmitters 22, 32, and 42 formed like the transmitter 12, and have receivers 23, 33 and 43 formed like the receiver 13. Here, each of the transmitters 12, 22, 32 and 42 corresponds to transmitting means of the invention. Further, each of the receivers 13, 23, 33 and 43 corresponds to receiving means of the invention.

Further, an arbitrated loop topology is formed by connecting the transmitter 12 and the receiver 23, the transmitter 22 and the receiver 33, the transmitter 32 and the receiver 43, the transmitter 42 and the receiver 13 respectively. An arbitrated loop topology is a state where three or more ports each are linked like a circle and, here, a transmitter and a receiver of one port are connected as described above.

In the network system formed as described, for example, the server 1 transmits an open command which orders to open the port first when the server 1 transmits data to a plurality of terminals among the terminals 2 to 4. The open command is formed with a plurality of bits (called a bit map area where appropriate below) so as to have flags corresponding to each port. The server 1 transmits the open command with only the bit corresponding to the port to be opened set to be 1, for example, and the rest of the bits set to be 0, for example, among a plurality of the bits. For example, when opening the ports 21 and 31 of the terminals 2 and 3 among the terminals 2 to 4, the server 1 transmits the open command with the bits corresponding to ports 21 and 31 set to be 1, and the rest of the bits set to be 0 among the bit map area.

The transmission of the open command is operated by the transmitter 12 of the port 11 in the server 1. The open command is consequently received by the receiver 13 of the port 11 in the server 1 via the receiver 23 and the transmitter 22 of the port 21 in the terminal 2, the receiver 33 and the transmitter 32 of the port 31 in the terminal 3, and the receiver 43 and the transmitter 42 of the port 41 in the terminal 4.

On the other hand, in the terminals 2 to 4, the open command being transmitted is received in each of the receivers 23, 33 and 43, and it is determined if the bits corresponding to the terminals themselves among the bit map area in the open command are 1, for example. If the bits corresponding to the terminals themselves are 1, the terminals open the ports.

The open ports among the terminals 2 to 4 alter the bits corresponding to the ports themselves among the bit map area in the open command from 0 to 1, for example, and each of the terminals transmits the altered open command from the transmitter of themselves to the receivers connected to the transmitter.

Further, when the bit corresponding to the terminal is not 1, the terminal transmits the receiving command as it is from the transmitter of itself to the receiver connected to the terminal.

The server 1 recognizes if the port to which data is to be transmitted is open or not by referring to the bit map area after transmitting the open command from the transmitter 12 of the port 11 to the receiver 23 of the port 21 of the terminal 2 and, then, the receiver 13 receives the open command transmitted from the transmitter 42 of the port 41 of the terminal 4.

In the terminals with the port being opened among the terminals 2 to 4, the port to which data is transmitted is open or not can be recognized by referring to the bit map area since the bit corresponding to the terminals among the bit area map is altered from 1 to 0.

In the server 1, data being transmitted is addressed to the port which is opened among the terminals 2 to 4.

As described above, a port is opened by the open command with only the bit corresponding to the port which is to be opened being set to 1 among the bit map area and the rest of the bits to 0, so that a plurality of ports can be opened with one open command. As a result, transmission efficiency can be improved especially in a case where a plurality of ports are opened. In the embodiment, the port is opened by the open command with the bit corresponding to the port which is to be opened being set to 1 among the bit map area and the rest of the bits to 0. However, the open command with the bit corresponding to the port which is to be opened being 0, and the rest of the bits being 1 may be transmitted to each terminal, and the terminals which received the command may transmit the bit corresponding to themselves being altered from 0 to 1. That is, it can be made possible to input information which distinguishes information to open or not to open in the bit map area.

Moreover, in the terminals with the ports being opened among the terminals 2 to 4, the bits corresponding to the terminals themselves among the bit map area are altered from 1 to 0. Accordingly, if the port is being opened or not can be judged easily.

Next, FIG. 2 shows a structural example (format) of the open command.

In the embodiment, the open command is formed with, for example, 5 transmission words.

Figure 20:
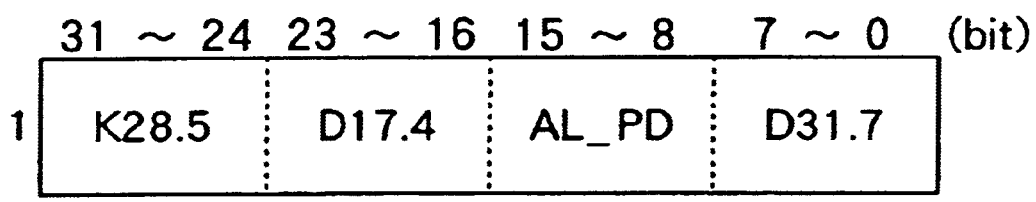
FIG. 20 is a format of a command for opening a plurality of ports in a fibre channel.

The first transmission word has a code which orders to open the port is being allocated and, here, it is formed like an order set OPNyr shown in FIG. 20, for example, except for the 15th to 8th bits. That is, since the open command belongs to the order set OPNyr, here, the first transmission word is formed like the order set OPNyr except for the 15th to 8th bits. A specific value Dxx,x (code after being 8B/10B converted) for distinguishing the order set from other order sets is allocated in the 15th to 8th bits.

The whole 128 bits forming the second to the fifth transmission words of the open command are the bit map area. For example, the 31st to the 0 bit of the second transmission word are the bit map area in which port address (port ID) allocated to the ports 0 to 31. Likewise, the 31st to the 0 bits of the third transmission word are the bit map area in which the port address is allocated to the ports 32 to 63, and the 31st to the 0 bits of the fourth transmission word are the bit map area in which the port address is allocated to the ports 64 to 95 respectively.

The 31st to the 1st bits of the fifth transmission word are the bit map area in which the port address is allocated to the ports 96 to 126, and the 0 bit is a reserved region (reserved bit).

That is, in the fibre channel so far, the greatest numbers of the ports which can form the arbitrated loop topology are 127. Hence, in the embodiment, the bit map area is formed with 128 bits which is greater than 127 bits, and the smallest number of integral multiples of 32 bits (1 transmission word) so that each port can be appointed even in a case where the arbitrated loop topology is formed with the greatest numbers of the ports. In such a case, 1 bit is an excess, however, the 0 bit of the 5 transmission word is to be a reserved bit as the extra 1 bit in FIG. 2.

When opening the ports, the open command with the bit corresponding (allocated) to the port which is to be opened being 1 and the rest of the bits being 0 among the bit map area is transmitted from the server 1 to each terminal.

Next, an open order set transmission processing for transmitting the open command and an open order set reception processing for receiving the open command are described with reference to FIG. 3 and FIG. 4. The description in the followings includes a description of a data communication method and a data recording/reproducing method of the embodiment.

Here, the open command is, for example, transmitted from the server 1 and received in the terminals 2 to 4. That is, the transmission processing of the open order set is performed in the server 1 and the reception processing of the open order set is performed in the terminals 2 to 4.

Figure 3:
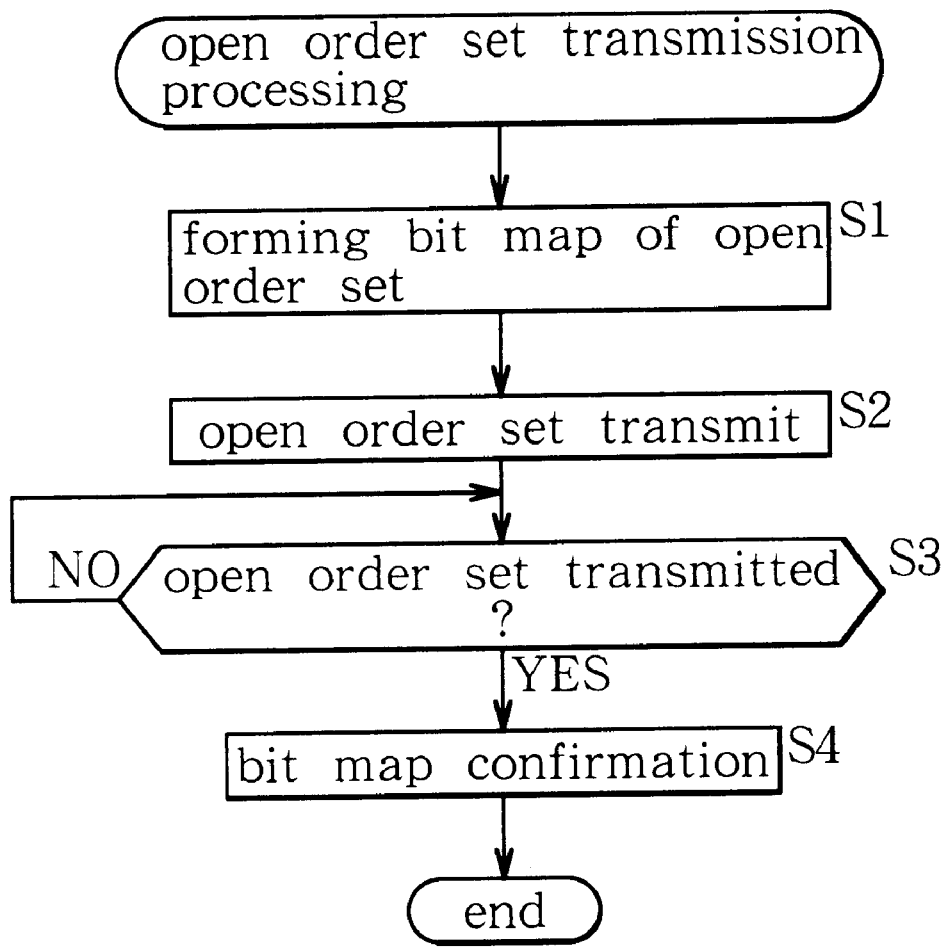
FIG. 3 is a flow chart for describing transmitting process of an open order set which the open command.
Figure 4:
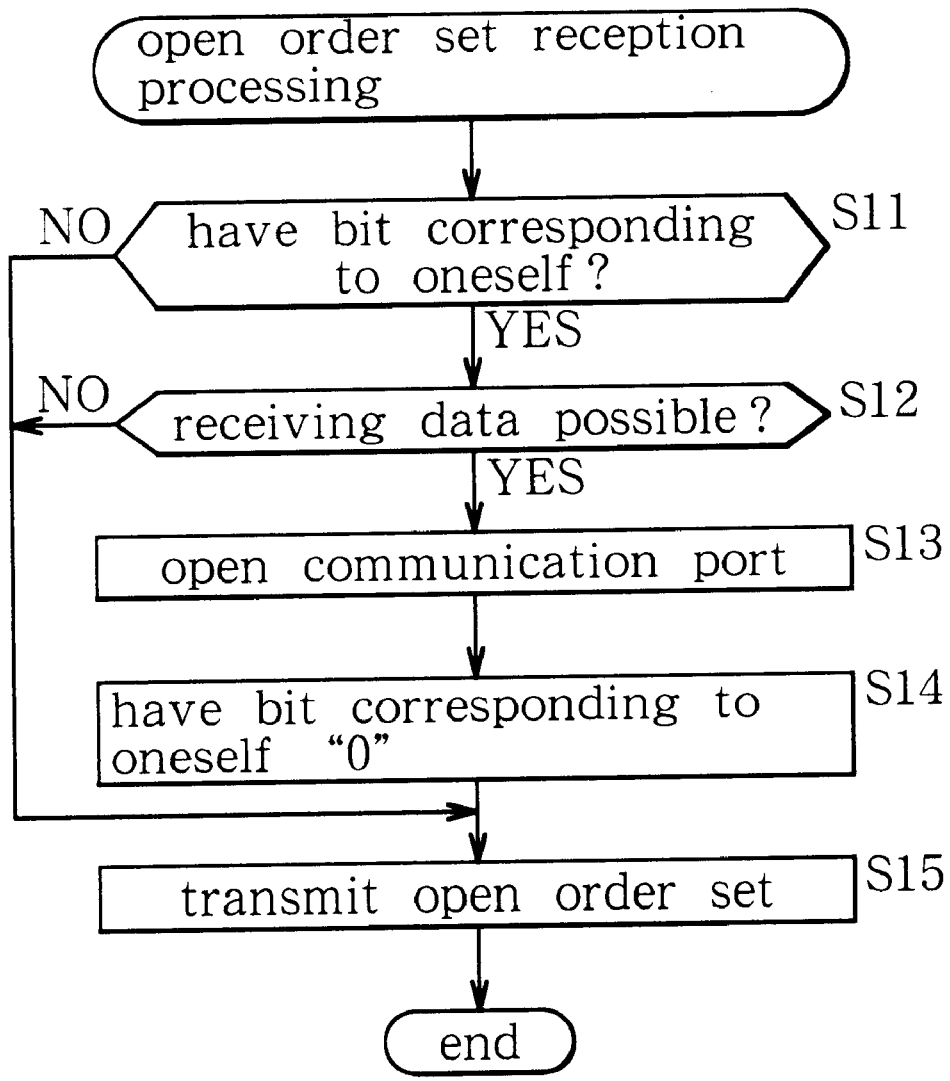
FIG. 4 is a flow chart for describing receiving process of an open order set which receives the open command.

In the transmission processing of the open order set, first, a bit map area of the open command is formed in a step S1, as shown in FIG. 3. That is, only the bit corresponding to the port which is to be opened is set to be 1 and the rest is set to be 0 among the bit map area of the open command as shown in FIG. 2. Further, a step is taken to a step S2 and the open command having a bit map area formed in the step S1 described in FIG. 2 is transmitted, and a step is taken to a step S3.

In the step S3, it is judged whether the open command transmitted from a port is transmitted via other ports or not as described above, and if it is not so, the step returns back to the step S3. Further, in the step S3, if it is judged that the open command is transmitted via other ports, a step is taken to a step S4. The opened ports are recognized by referring to the bit map area of the open command and processing is completed.

In the server 1, after the transmission processing of the open order set is performed as described, transmission of data is started addressed only to the opened ports.

On the other hand, the terminals 2 to 4 perform the reception processing of the open order set upon receiving the open command. The reception processing of the open order set is described in the followings with reference to FIG. 4.

In the reception processing of the open order set, first, it is judged whether the bit corresponding to the port of the open order set is 1 or not among the bit map area of the open command received in a step S11. In the step S11, when it is judged that the bit corresponding to the open order set is not 1, steps from S12 to S14 are skipped and a step S15 is taken, then, the open command received is transmitted as it is to the receiver of the other port connected to the transmitter of the open order set and the processing is completed.

Further, in the step S11, when it is judged that the bit corresponding to the open order set itself is 1, the step S12 is taken and it is judged whether the port of the open order set is in a state where data can be received or not. In the step S12, when it is judged that it is in a state where the port of the open order set can not receive data, the step S13 and S14 are skipped and a step S15 is taken. In the step S15, as described above, the open command received is transmitted and the processing is completed.

On the other hand, in the step S12, when it is judged that it is in a state where the port of the open order set itself can receive data, the step S13 is taken and the port is opened, and processing takes a step further to the step S14. In the step S14, the bit corresponding to the port of the bit map area is altered from 1 to 0, and a step S15 is taken. In the step S15, as described above, the altered open command of the bit map area is transmitted to the receiver of the other port connected to the transmitter of the open order set and processing is completed.

By using the open command described above, especially, opening a plurality of ports can be performed with a shorter time than before.

Figure 5:
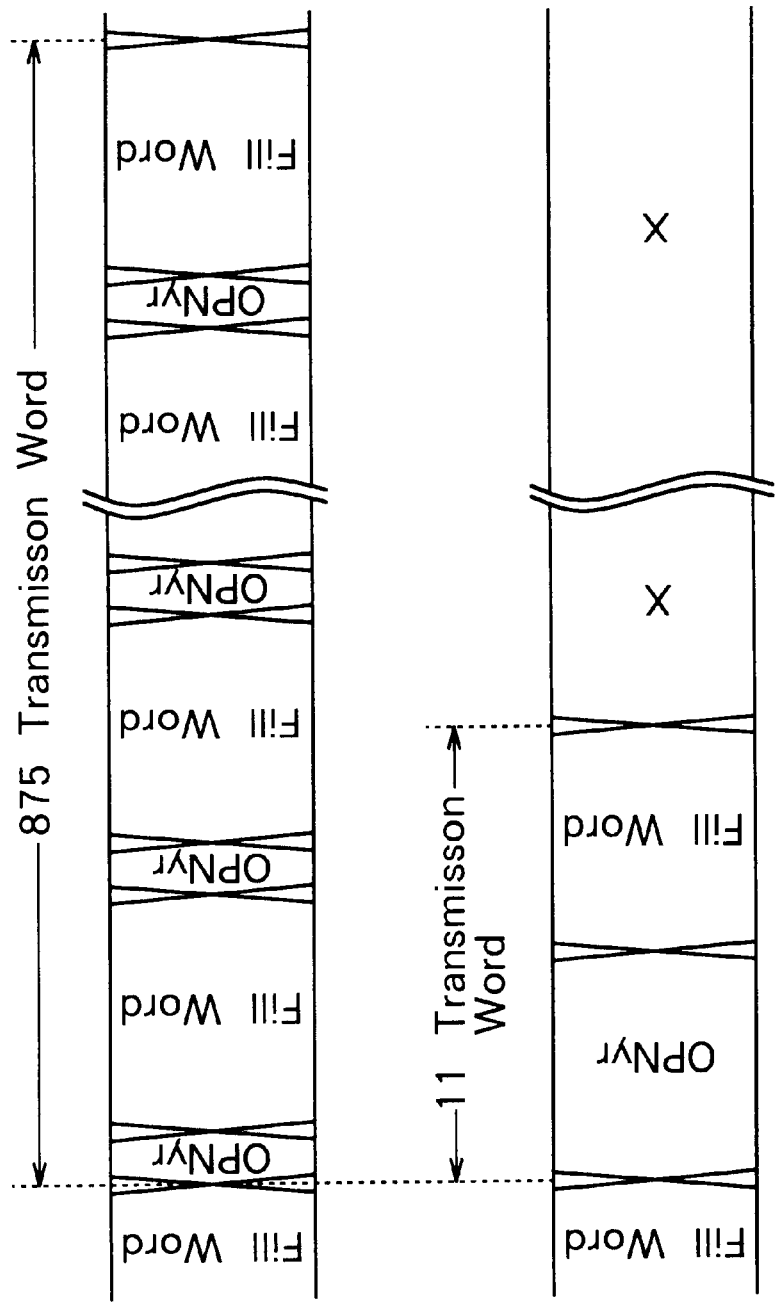
FIG. 5(A) and FIG. 5(B) are description charts for describing the time needed to open a port.

As described above, when opening 125 ports in a related art as shown in FIG. 5(A), the order set OPNyr is required to be transmitted to each of 125 ports and, further, fill words (especially idle) of at least 6 transmission words must be inserted between each order set OPNyr. Consequently, at least time which corresponds to 875 transmission words is needed to open 125 ports.

On the other hand, as shown in FIG. 5(B), according to the transmission of the open command in which the bit map area mentioned above is provided, 125 ports can be opened with time which corresponds to 11 (=5 +6) transmission words, that is 1/7 of what it used to be since it only needs to transmit the open command of 5 transmission words and the fill word of 6 transmission words.

A case where the invention is applied to the communication based on the specification of the fibre channel has been described so far, however, an application range of the invention is not limited to this. The invention is, further, applicable to both a serial communication and a parallel communication.

In the embodiment, a case where data is transmitted from the server 1 to the terminals 2 to 4 is described, however, it is also possible to transmit data from the terminals 2 to 4 to the rest of the terminals or the server 1.

Moreover, the invention is applicable to a case where one port is opened, however, it is especially effective with a plurality of ports.

Further, in the embodiment, with the opened port among the terminals 2 to 4, confirming if the port in the server 1 is opened or not is performed by altering the bit corresponding to the open order set among the bit map area from 1 to 0. However, confirmation can, other than that, also be achieved by transmitting information of the port being opened separately from the open command to the terminals.

Moreover, in the embodiment, as shown in FIG. 2, the bit map area of the open command is formed with 4 transmission words, however, the volume of the bit map area is not limited to this. It can be also determined according to the number of the ports forming the arbitrated loop topology. For example, if the numbers of ports are 20, then the bit map area is formed with 2 transmission words. Further, forming the bit map area with 4 transmission words is when the greatest number of connected port is 127, however, the number of transmission words of the bit map area can be inserted using the extra bit map area.

Moreover, in the embodiment, the port is made corresponded by allocating the port address as so-called absolute value to each bit of the bit map area. However, corresponding each bit of the bit map area and the port can be performed relatively. That is, for example, having the port transmitting the open command as a standard, it is possible to correspond the port having the receiver which is connected to the transmitter of the port to the first port of the bit map area, and to correspond each bit of the bit map area and the ports likewise.

Next, examples of a specific form of the server 1, the ports 11, 21, 31 and 41 of each terminal 2, 3 and 4 will be described.

Figure 6:
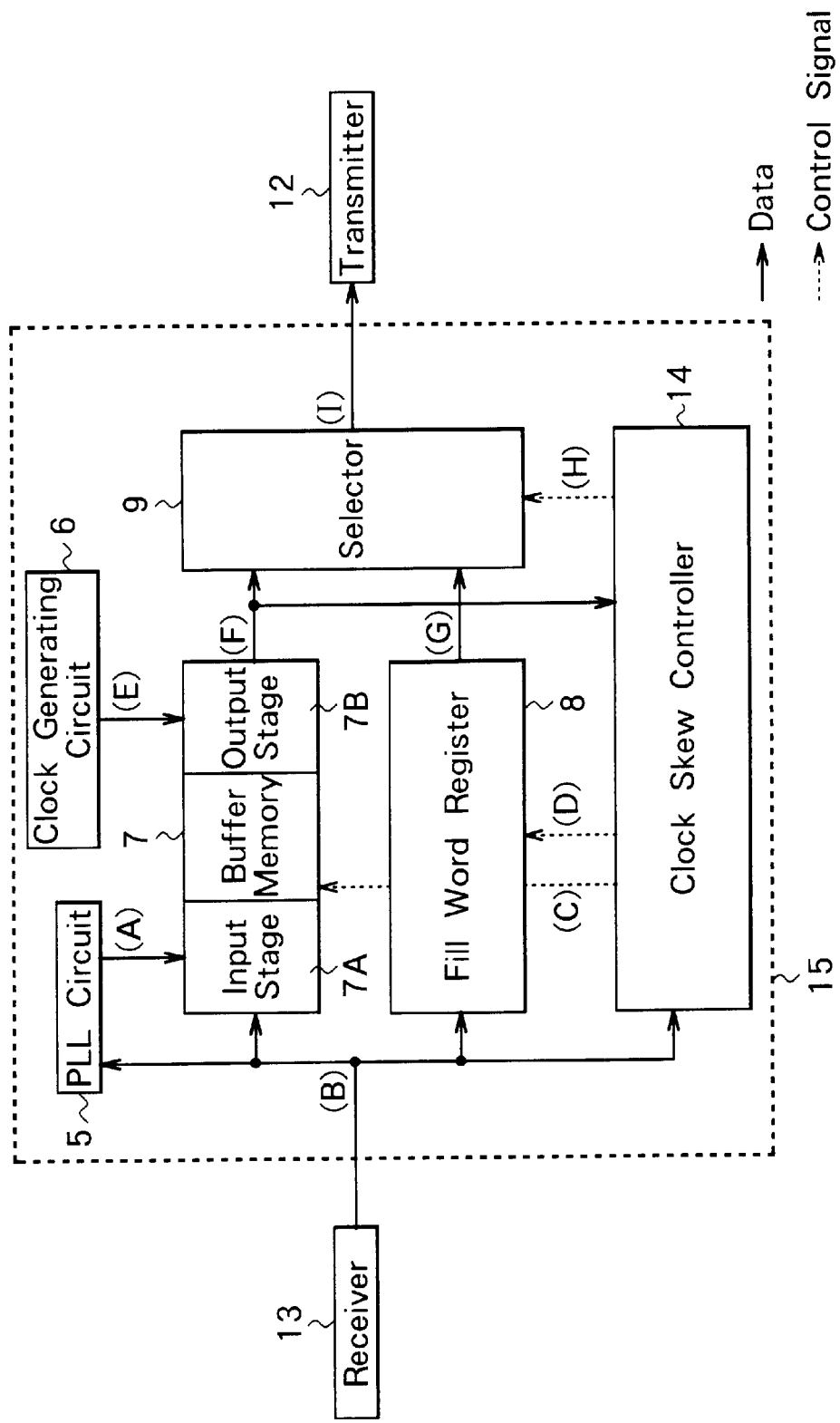
FIG. 6 is a block diagram showing a structural example of a port to which the invention is applied.
Figure 15:
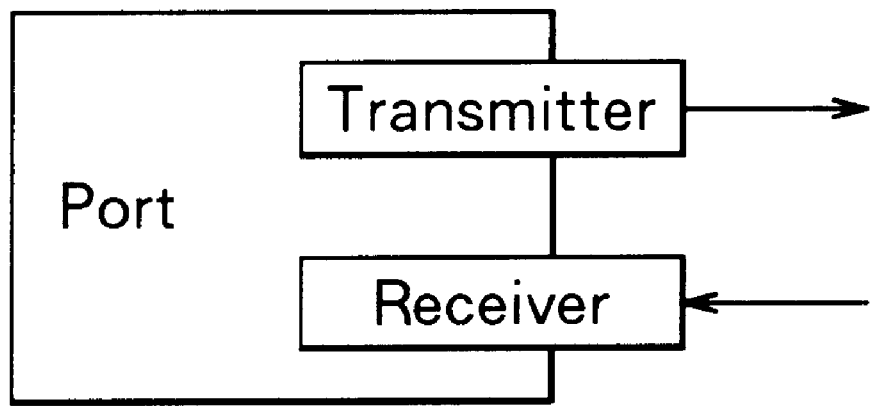
FIG. 15 is a block diagram showing a structural example of a port of a fibre channel of a related art.
Figure 16:
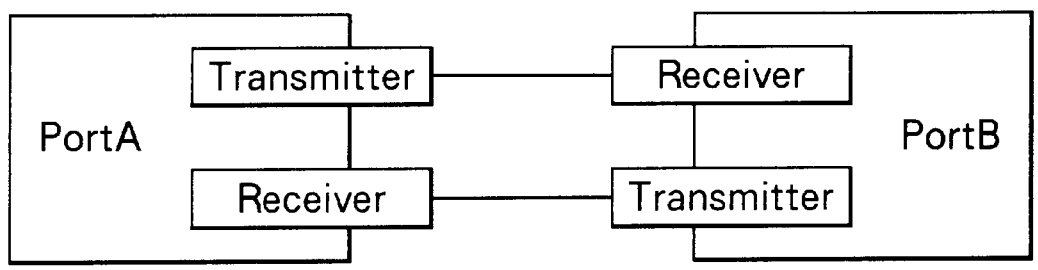
FIG. 16 is a block diagram showing a example of a port connection of the fibre channel of the related art.
Figure 17:
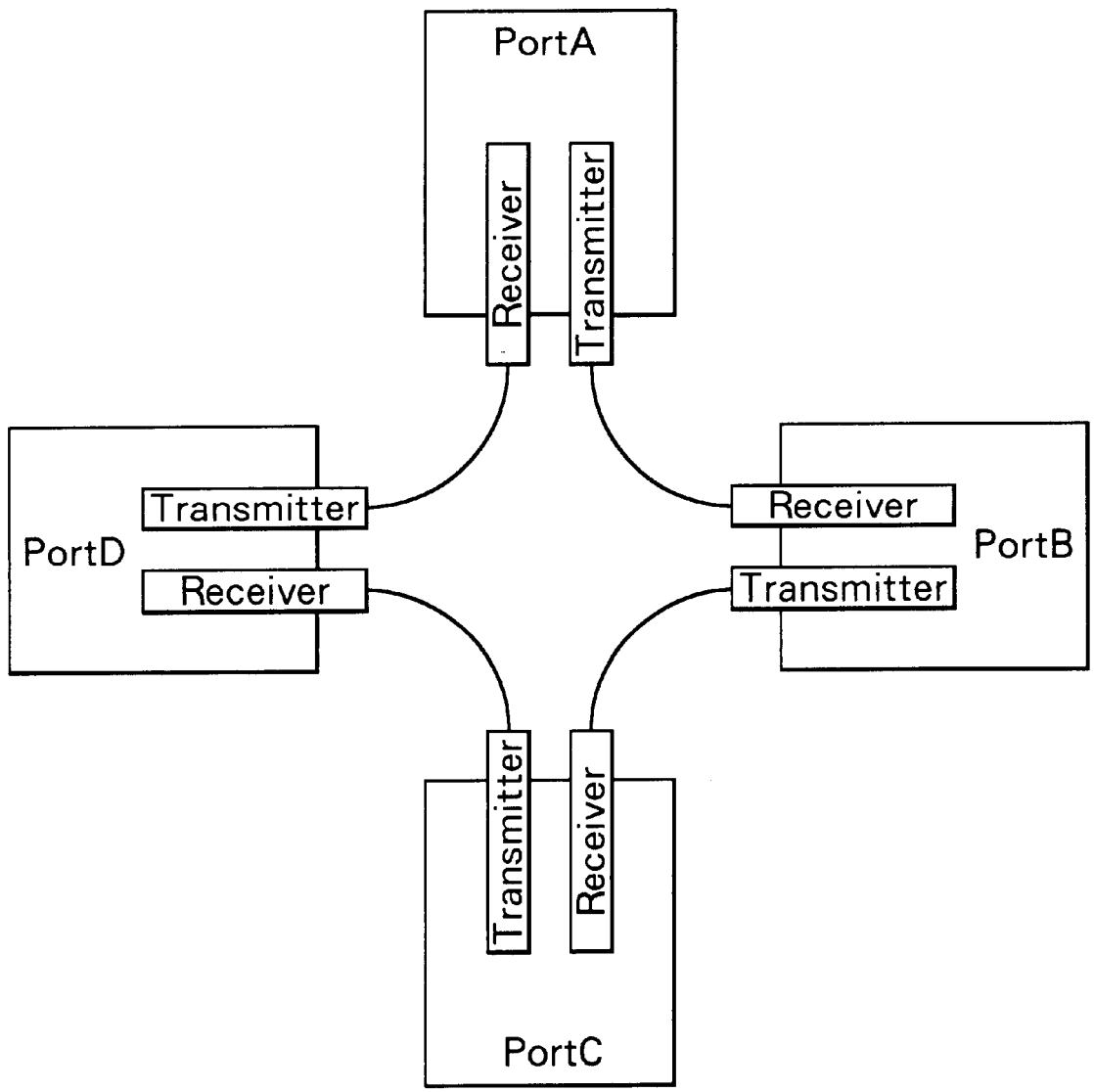
FIG. 17 is a block diagram showing another example of a port connection of the fibre channel of the related art.
Figure 18:
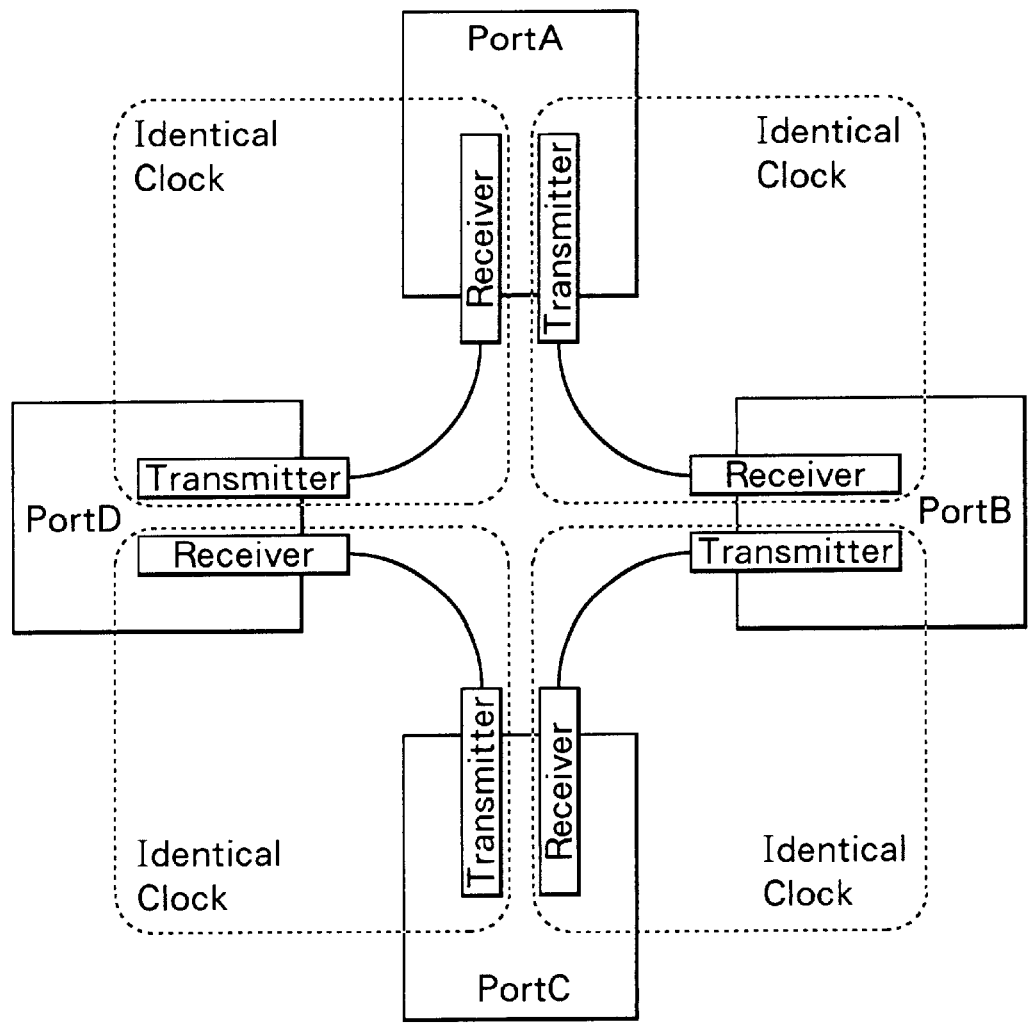
FIG. 18 is description figure for describing an operation clock in a port connected by ted loop topology of a related art.
Figure 19:
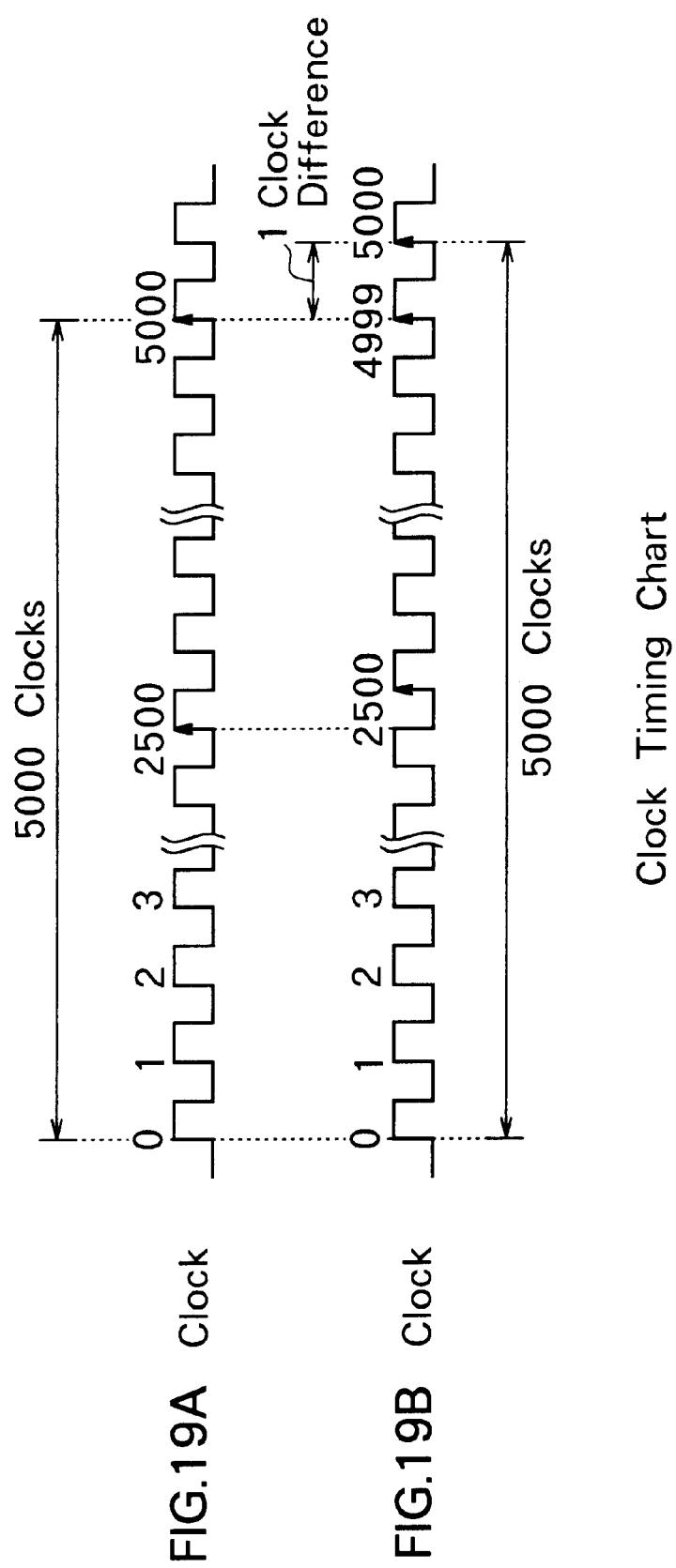
FIG. 19(A) and FIG. 19(B) are description figure for describing a clock skew.

FIG. 6 shows a structural example of a port of the embodiment to which the invention is applied. The port is formed basically same as the port of the fibre channel shown in FIG. 15 except that a clock skew absorbing apparatus 15 is provided to absorb clock skew which is a deviation between a transmission clock and a receiver clock.

The port in FIG. 6 forms an arbitration loop topology with the other two or more ports, not shown. A receiver 13 receives data from the transmitter of other port being connected synchronizing with a receiver clock which is the same clock with the transmitter clock. When data received is addressed to this port, the receiver 13 is to supply data to, for example, CPU (Central Processor Unit), or the like, not shown. That is, the port shown in FIG. 6 forms, for example, an input/output port for a computer or peripheral device such as a hard disk drive. In a case where the port forms the input/output port of the computer, for example, data addressed to the port received by the receiver 13 is transferred to the CPU.

When data received is addressed to the other ports, that is, the port shown in FIG. 6 functions as a repeater, the receiver 13 supplies data to the clock skew absorbing apparatus 15.

The clock skew absorbing apparatus 15 absorbs the deviation between the receiver clock in the receiver 13 and the transmitter clock in the transmitter 12, which is clock skew, and then data from the receiver 13 is supplied to the transmitter 12.

The transmitter 12 transmits data from the clock skew absorbing apparatus 15 to the receiver of other port being connected. Further, in a case where data transmitted to the designated port is supplied from the CPU of the computer or the like, the transmitter 12 transmits the data.

The clock skew absorbing apparatus comprises a buffer memory 7, a fill word register 8, a selector 9, clock skew controller 14, a PLL (Phase Lock Loop) circuit 5 and a clock generating circuit 6 as shown in the figure. Here, the buffer memory 7 corresponds to the first storing means of the invention and the fill word register 8 corresponds to the second storing means of the invention. Further, the clock skew controller 14 corresponds to the control means of the invention. Moreover, the PLL circuit 5 corresponds to the first clock generating means of the invention and the clock generating circuit 6 corresponds to the second clock generating means of the invention.

Figure 21:
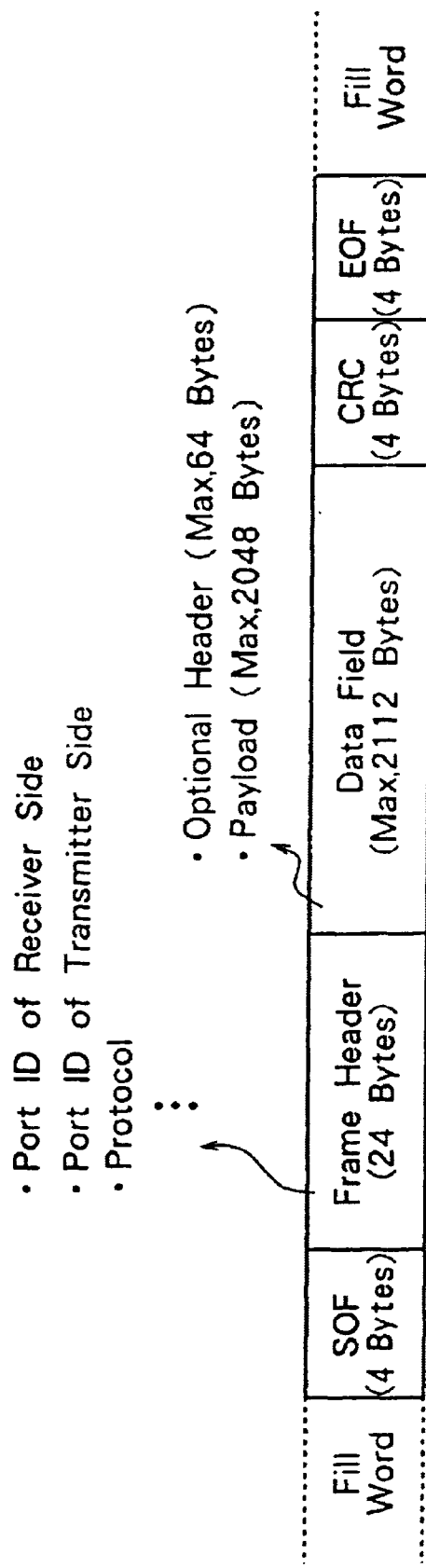
FIG. 21 is a structure of a frame for transmitting and receiving data in a fibre channel.

The buffer memory 7 is formed with, for example, FIFO (First In First Out) memory and data allocated in the frame described in FIG. 21 (called frame data in the followings where appropriate), (a first data) among the data from the receiver 13 is recorded under the control of the clock skew controller 14. Further, data recorded is read out and supplied to the selector 9.

Here, a clock (a first clock) from the PLL circuit 5 is supplied to an input stage 7A of the buffer memory 7, and recording of data from the receiver 13 is performed synchronizing with the clock. Further, a clock (a second clock) from the clock generating circuit 6 is supplied to an output stage 7B, and reading data recorded in the buffer memory 7 is performed synchronizing with the clock. Therefore, recording and reading data in the buffer memory 7 are performed asynchronously.

A fill word register is also formed with, for example, the FIFO memory. Fill word (a second data) among data from the receiver 13 is recorded under the control of the clock skew controller 14. Further, the fill word recorded is read out and supplied to the selector 9.

The selector 9 selects either output of the buffer memory 7 or output of the fill word register 8 under the control of the clock skew controller 14 and supplies it to the transmitter 12. The clock skew controller 14 controls the buffer memory 7, the fill word register 8 and the selector 9 based on the output of the buffer memory 7 and so on.

The PLL circuit 5 generates the clock, that is, a receiver clock which synchronizes with data from the receiver 13 and supplies it to the input stage 7A of the buffer memory 7. A clock identical to the receiver clock is generated in the receiver 13 and receiving data is performed synchronizing with the clock.

The clock generating circuit 6 generates a transmitter clock to operate a transmitter 12 and supplies it to the output stage 7B of the buffer memory 7. The transmitter clock is supplied to the blocks such as the clock skew controller 14 and the transmitter 12, (not shown), other than the buffer memory 7.

Next, operation of a clock skew absorbing apparatus 15 will be described with reference to a timing chart of FIG. 7.

First, when data (frame) addressed to the receiver 13 itself is received in the receiver 13, the data is transferred to such as CPU, not shown. Further, when data to be transferred to another port is supplied to the transmitter 12 from such as the CPU, the transmitter 12 transfers the data to the port.

On the other hand, when the port functions as a repeater, that is, when data addressed to other port is received in the receiver 13, the data is supplied to the buffer memory 7, the fill word register 8, the clock skew controller 14 and the PLL circuit 5 of the clock skew absorbing apparatus 15.

In the PLL circuit 5, a receiver clock shown in FIG. 7(A) is generated synchronizing with data from the receiver 13 and supplied to the input stage 7A of the buffer memory 7.

Here, data shown in FIG. 7(B) is supplied to the buffer memory 7, the fill word register 8 and the clock skew controller 14 synchronizing with the receiver clock. In FIG. 7, H1 to H3 represent three transmission words obtained by dividing 24 bytes of frame header into transmission word (4 bytes in a fibre channel as mentioned above) units.

When the clock skew controller 14 receives data from the receiver 13, the data (FIG. 7B) is judged whether it is frame data or fill words. In a case of fill words, a will word read signal is set to, for example, H (High) level and supplied to the fill word register 8. When the fill word register 8 receives the H level fill word read signal, the fill word register 8 records the supplied fill words. Further, fill word register 8 reads out the recorded fill words sequentially and supplies them to the selector 9, as shown in FIG. 7(G).

The fill word register 8 retains the fill word which is recorded in the last occasion until the next fill word is supplied, and after the last fill word is read out, the fill word retained in the register which is stored last is continued to be read out. Accordingly, here, the fill words are continuously outputted from the fill word register 8 (FIG. 7(G)).

On the other hand, when data from the receiver 13 (FIG. 7(B)) is frame data, the clock skew controller 14, for example, sets a frame data read signal to H level and supplies it to the buffer memory 7.

Here, when data from the receiver 13 is neither a fill word nor frame data, the fill word read signal (FIG. 7(D)) and the frame data read signal (FIG. 7C) each are set to L (Low) level. In a fibre channel, as described above, either the frame data or the fill words are always transmitted (in practice, in addition to frame data and fill words, a command known as order set may be transmitted, however, as order set comprises 1 transmission word and its data amount is not limited by clock skew, it will be ignored here). Therefore, when a port functions as a repeater, and either one of the fill word read signal or the frame data read signal is H level, the other will be L level (FIG. 7(C), FIG. 7(D))

When the buffer memory 7 receives an H level frame data read signal (FIG. 7(C)), data from the receiver 13 (frame data) is recorded successively. The recording is performed synchronizing with the receiver clock from the PLL circuit 5 (FIG. 7(A)), as described above.

Regarding the frame data recorded in the buffer memory 7, it is outputted from the buffer memory 7 synchronizing with the transmitter clock from the clock generating circuit 6 shown in FIG. 7(E), with a timing described in the followings, and is supplied to the selector 9. The timing of outputting from the buffer memory 7 is shown in FIG. 7(F).

Thereby, the clock of the frame data received synchronizing with the receiver clock in the receiver 13 is re-clocked onto the transmission clock.

Further, by recording only the frame data but not the fill words, clock skew which occurs when the receiver clock (FIG. 7(A)) is faster than the transmission clock (FIG. 7(E)) is absorbed (prevented). That is, if the receiver clock is faster than the transmission clock and data received synchronizing with the receiver clock continued to be transmitted synchronizing with the transmission clock, there would be no time for transmitting data. On the other hand, fill words (especially, idle) are to fill the spaces between frames as described, and as they are not absolutely necessary, there is no problem if they are not transmitted (however, if fill words are not transmitted, frame data must be transmitted). Therefore, when the receiver clock is faster than the transmission clock, by recording only the frame data in the buffer memory 7 among the data received by the receiver 13, and by giving priority to its transmission, loss of data can be prevented (in this case, fill words may be lost, but as described above, this is not such a problem).

The clock skew controller 14 also monitors the amount of frame data recorded in the buffer memory 7, and when the data amount of the frame data in the buffer memory 7 in which SOF of the frame data has been recorded reaches a predetermined value C, the buffer memory 7 is controlled so that reading out the frame data is started synchronizing with the transmitter clock (FIG. 7(E)). As a result, the frame data recorded in the buffer memory 7 is, as shown in FIG. 7(E), sequentially read out from the buffer memory 7 synchronizing with the transmission clock and is supplied to the selector 9.

The clock skew controller 14 monitors the output of the buffer memory 7, and when EOF of the frame data is read out, reading data from the buffer memory 7 is interrupted.

Here, by starting to read out data after the amount of the frame data in the buffer memory 7 reaches the predetermined value C, clock skew when the receiver clock (FIG. 7(A)) is slower than the transmission clock (FIG. 7(E)) is absorbed (prevented). That is, if the receiver clock is slower than the transmission clock and data received synchronizing with the transmission clock, there would be no time for receiving data. On the other hand, fill words (especially, idle) are to fill the spaces between frames as described above, and they are not absolutely necessary or, conversely, can be exceeded so that there is no problem if too many of them are transmitted. Hence, when the receiver clock is slower than the transmission clock, the fill data is transmitted until the frame data is accumulated to the predetermined amount C in the buffer memory 7, and by starting transmission of the frame data after the predetermined amount C of the frame data is accumulated in the buffer memory 7 loss of the frame data (that is, reception of frame data is unable to keep up with its transmission) is prevented.

The predetermined value C is uniquely determined by the following equation from the frame length L (frame data amount).

$$L < (1/(S \times 10^{-6}) - \alpha) \times C \quad (1)$$

L represents the maximum frame length in transmission words (here, 4 bytes as described above), and S represents the maximum clock deviation in ppm (200 ppm in the fibre channel specification). $\alpha$ is a factor relating to the performance of the buffer memory 7. For example, it is a constant corresponding to such as time in which the fact that data is recorded can be recognized in the output stage 7B. Further, in the equation (1), C is expressed by transmission word unit.

As described above, the frame data outputted from the buffer memory 7, or the fill words outputted from the fill word register 8 are selected by the selector 9 under the control of the clock skew controller 14 and supplied to the transmitter 12.

That is, until the frame data of the predetermined amount C is recorded from the start of the frame data (SOF) in the buffer memory 7, the clock skew controller 14 outputs an level L selection signal to the selector 9, as shown in FIG. 7(H), for example. When the selector 9 receives the level L selection signal, it selects the output of the fill word register 8, and by this, as shown in FIG. 7(I), outputs the fill words to the transmitter 12. When the predetermined amount C of the frame data is recorded from the start of the frame data (SOF) in the buffer memory 7, the clock skew controller 14 outputs, for example, as shown in FIG. 7(H), the H level selection signal to the selector 9. When the selector 9 receives the H level selection signal, it selects the output of the buffer memory 7, and by this, outputs the frame data to the transmitter 9 as shown in FIG. 7(I).

Subsequently, when the end of the frame data (EOF) is read out from the buffer memory 7 and this is selected by the selector 9 and supplied to the transmitter 12, the clock skew controller 14 sets the selection signal to the L level (FIG. 7(H)). In this case, the selector 9, as described above, selects the output of the fill word register 8 and fill words are outputted to the transmitter 12 (FIG. 7(I)). After the predetermined amount C of the frame data is recorded again from the start of the frame data (SOF), the same processing is repeated.

Since clock skew between the receiver clock and the transmitter clock can be absorbed as described, the frame length L may take any value provided that it satisfies the equation (1). Therefore, for example, even a large volume of data such as several M bytes or more of image data can be transmitted by 1 frame which, as a result, greatly improves the transmission efficiency.

The buffer memory 7 needs to have recording capacity at least large enough to record the predetermined amount C determined by the equation (1).

Next, the processing of the clock skew controller 14 shown in FIG. 7 will be further described with reference to the flow charts of FIG. 8 and FIG. 9.

The processing of the clock skew controller 14 may be broadly distinguished as input processing in which input of data from the receiver 13 is processed, and output processing in which the data is outputted to the transmitter 12.

Figure 8:
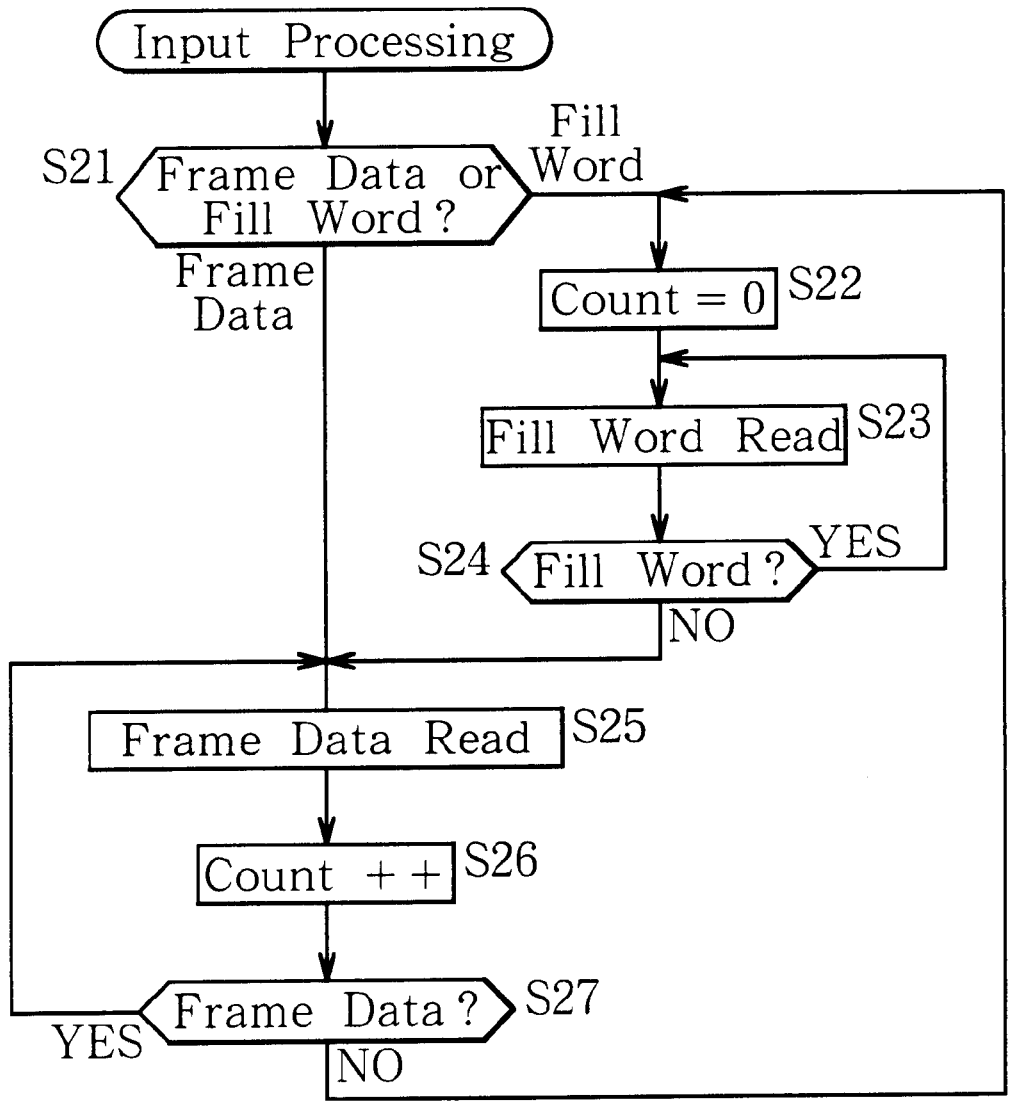
FIG. 8 is a flow chart for describing data input process by a clock skew controller in the port shown in FIG. 6.

In the input processing, as shown in the flow chart of FIG. 8, it is first judged whether data supplied from the receiver 13 is frame data or fill words in the step S21. When it is judged that the data supplied from the receiver 13 is frame data in the step S21, a step is taken to a step S25.

Further, in the step S21, when it is judged that data from the receiver 13 is fill words, a step is taken to a step S22, and a variable Count which counts the amount of the frame data recorded in the buffer memory 7 is initialized to, for example, 0, and a step is taken to a step S23. In the step S23, the fill word register 8 is controlled to record fill words (fill word read signal (FIG. 7(D)) is set to H level), and fill words judged to have been supplied from the receiver 13 in a step S21 are recorded in the fill word register 8. Next, a step is taken to the step S24, after data is supplied from the receiver 13, and it is judged whether or not the data is fill words. In the step S24, when it is judged that data from the receiver 13 is fill words, a step returns back to the step S23, and the processing of the step S23 and the step S24 is repeated until it is judged that data from the receiver 13 is not fill words.

Further, in the step S24, when it is judged that data from the receiver 13 is not fill words, that is, the data from the receiver 13 is frame data, a step is taken to a step S25, and the buffer memory 7 is controlled to record the frame data (frame data read signal (FIG. 7(C)) is set to H level) and frame data judged to have been supplied from the receiver 13 in the step S21 or the step S24 is recorded in the buffer memory 7.

When frame data is recorded in the buffer memory 7, a step is taken from a step S25 to S26 and the variable Count is incremented by one. Next, a step is taken to a step S27 after data is supplied from the receiver 13. In the step S27, it is judged whether data from the receiver 13 is frame data or not. In the step S27, when it is judged that data from the receiver 13 is frame data, a step returns to the step S25, and the processing from the step S25 to S27 is repeated until data from the receiver 13 is not frame data. Further, in the step S27, when it is judged that data from the receiver 13 is not frame data, that is, the data is fill words, a step is taken back to the step S22 and the processing described above is repeated thereafter.

Figure 9:
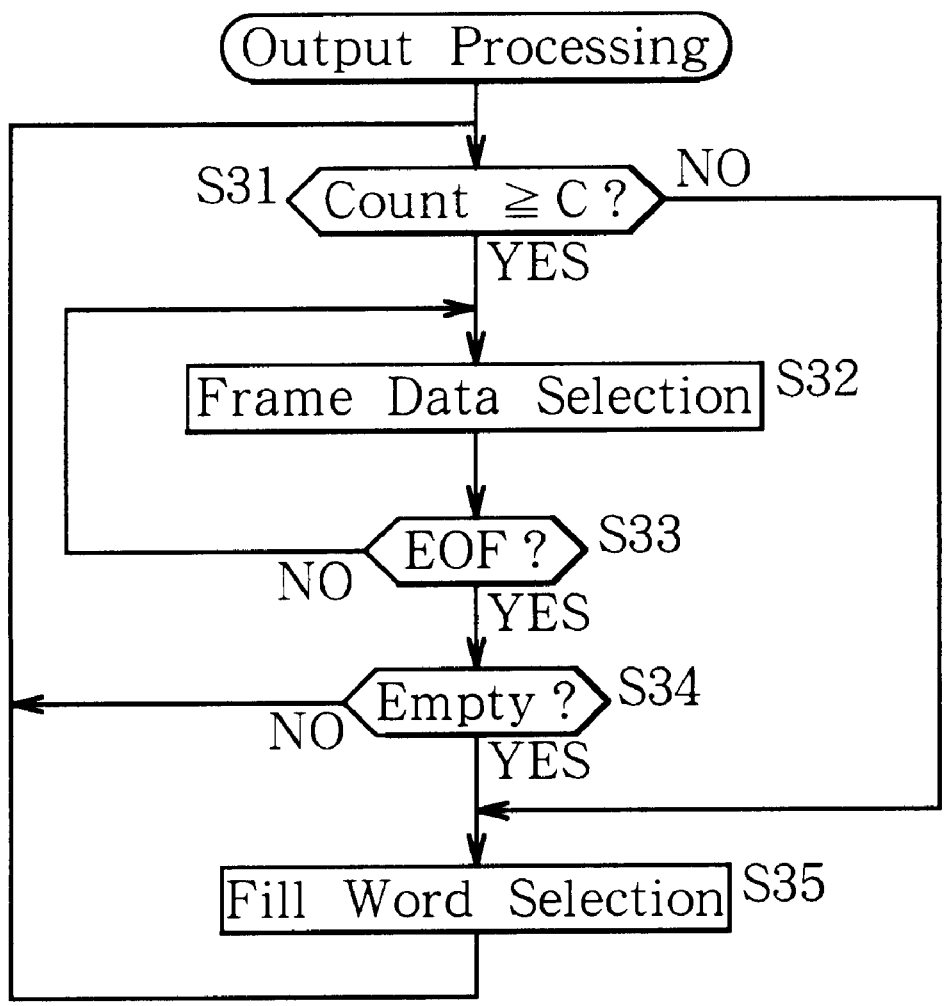
FIG. 9 is a flow chart for describing data output process by a clock skew controller in the port shown in FIG. 6.

Next, in the output processing, as shown in the flow chart of FIG. 9, it is first judged whether or not the variable Count is equal or greater than the predetermined value C in a step S31. In the step S31, when it is judged that the variable Count is not equal or greater than the predetermined value C, that is, when the frame data recorded in the buffer memory 7 has not yet reached the predetermined amount C, a step is taken to a step S35, and the selector 9 is controlled (selection signal (FIG. 7(H)) is set to H level) to select fill words, and a step returns back to the step S31. In such a case, therefore, the fill words read out from the fill word register 8 are supplied to the transmitter 12.

On the other hand, in the step S31, when it is judged that the variable Count is equal or greater than the predetermined value C, that is, when the predetermined amount C of frame data is recorded in the buffer memory 7, a step is taken to a step S32, the selector 9 is controlled (selection signal FIG. 7(H) is set to H level) to select fill words. In such a case, therefore, the frame data read out from the buffer memory 7 is supplied to the transmitter 12.

Further, a step is taken to a step S33, and it is judged whether or not EOF of the frame data is read out from the buffer memory 7. In the step S33, when it is judged that the EOF is not yet read out, that is, when the frame data is still in the process of reading out, a step returns back to the step S32, and the selector 9 is controlled so as to select the frame data which is read out.

Moreover, in the step S33, when it is judged that the EOF has been read out from the buffer memory 7, that is, when reading data of a given frame is completed, a step is taken to a step S34, and it is judged whether or not the next frame data is recorded in the buffer memory 7. When, in the step S34, it is judged that the next frame data is recorded in the buffer memory 7, that is, when the buffer memory 7 is not empty, a step returns back to the step S31. Further, in the step S34, when it is judged that the next frame data is not recorded in the buffer memory 7, that is, when the buffer memory 7 is empty, a step is taken to a step S35, and as described above, the selector 9 is controlled to select fill words and a step returns back to the step S31.

Figure 10:
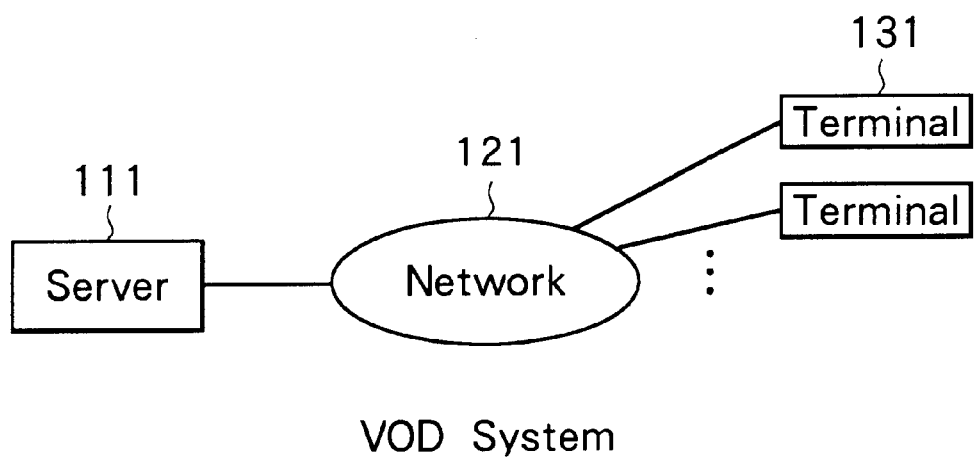
FIG. 10 is a bock diagram showing a structural example of a VOD system to which the invention is applied.

Next, FIG. 10 shows a structural example of an embodiment of VOD (Video On Demand) system (system means a logical collection of a plurality of units in which these units may or may not be allocated in a same body) as an example to which the invention is applied.

A server 111 manages program data such as image data or audio data for distribution to users, and distributes desired program data via a network 121. The network 121 may be formed with a transmission medium such as, for example, a CATV (Cable Television) network, Internet, a terrestrial circuit, a satellite circuit or public network. A request from a terminal 131 is transmitted to the server 111 and the program data transmitted from the server 111 is transmitted to the terminal 131. The network 121 is not necessarily only one of the above-mentioned transmission media, but it also may be a combination of, for example, satellite circuits and public circuits.

The terminal 131 is operated when requesting the program data from the server 111, and the program data transmitted by the server 111 via the network 121 in accordance with the request is received, then, it is displayed or outputted vocally.

In the VOD system formed as described, when users request the predetermined program data by operating the terminal 131, the request is received in the server 111 via the network 121. When the server 111 receives the request for the program data from the terminal 131, the program data is transmitted to the terminal 131 which has requested it via the network 121. In the terminal 131, the program data from the server 111 is received, displayed and outputted.

Therefore, users can watch the desired program.

The server 111 can transmit the same program data to a plurality of channels with differed starting time. In such a case, a system shown in FIG. 10 comprises a NVOD (Near VOD) system, and users can watch the program data from the beginning without waiting for a long time by selecting a channel whose starting time is closest to the desired program data.

Next, the structure of the server 111 will be specifically described with reference to FIG. 11.

The server 111 comprises, broadly speaking, a processing apparatus 116 and a disk array 112.

The processing apparatus 116 comprises a communication I/F (Interface) 52, a ROM (Read Only Memory) 53, a CPU 54, a HD 55, a communication unit 56, an encoder 57, a decoder 58, and a RAM (Random Access Memory) 59 being connected reciprocally via a bus.

The communication I/F 52 controls communications via the network 121. The ROM 53 records, for example, a system program and other necessary programs. The CPU 54 performs transmission of program data responding to the request from the terminal 131, and other various kinds of processing according to a request from the terminal 131 and, at the same time, controls each block forming the processing apparatus 116. The HD 55 records the program data which is to be transmitted to the terminal 131. The communication unit 56, which functions as an input/output port of the processing apparatus 121 and, for example, is formed like the port shown in FIG. 6 and therefore performs communication control based on the fibre channel specification.

The encoder 57 performs MPEG (Moving Picture Experts Group) encoding of image data and audio data supplied to it as program data. The decoder 58 performs, for example, MPEG decoding of program data which has been MPEG encoded. The RAM 59 temporarily records programs to enable the CPU 54 to perform various kinds of processing and such data required for its operation.

The disk array comprises a plurality of HDD (HD Drive) $113_1$ to $113_N$ (here, N is an integer equal to or more than 2). The HDD $113_1$ comprises communication unit $115_1$ and HD $114_1$. The communication unit $115_1$ is formed like the communication unit 56, and the HD$114_1$ records the program data. The communication unit $115_1$ also reads and writes data from/to the HD$114_1$. The other HDD, from HDD $113_2$ to $113_N$ also comprise communication unit $115_2$ to $115_N$ and HD $114_2$ to $114_N$ respectively, like the HDD $113_1$.

The communication units 56 and $115_1$ to $115_N$ are connected forming an arbitrated loop topology.

When a request for program data from the terminal 31 is received in the communication I/F 52 of the server 111, formed as described, the CPU 54 judges whether or not the program data is stored (recorded) in the HD55, and when it is stored, the program data is read out from there and transmitted to the communication I/F 52.

On the other hand, when program data requested from the terminal 131 is not stored in the HD 55 and the program data is stored in the disk array 112, the program data can be read out by controlling the communication unit 56. In such a case, among the communication units $115_1$ to $115_N$ forming the arbitrated loop topology, a communication unit forming HDD, other than the HDD having HD in which the program data requested from the terminal 131 is stored functions as a repeater described above, and the program data is transmitted from the disk array 112 to the communication unit 56.

Therefore, transmission of the program data can be effectively performed between the processing apparatus 116 and the disk array 112.

When the communication unit 56 receives the program data from the disk array 112, it is stored in the HD 55. Subsequently, as described above, the program data stored in the HD 55 is transmitted to the terminal 131 that requested it.

When the program data stored in the HD 55 or the disk array 112 is MPEG encoded, the program data can be transmitted after decoded by the decoder 58 or can be transmitted in the encoded state. However, when transmitting the program data being encoded, the program data is required to be decoded in the terminal 131.

Moreover, the MPEG encoded program data can be stored in the HD 55 or the disk array 112 of the server 111. In such a case, MPEG decoding can be, for example, performed by the encoder 57.

Further, in the server 111, the program data received from out side can be also stored in the disk array 112. When the program data is stored in the disk array 112, among the communication units $115_1$ to $115_N$, forming an arbitrated loop topology, a communication unit forming HDD, other than the HDD having HD in which the program data from outside is stored functions as a repeater as described above, and the program data is transmitted from the communication unit 56 to the disk array 112.

Therefore, in such a case, transmission of the program data can be performed effectively between the processing apparatus 116 and the disk array 112.

A case in which the invention is applied to a communication based on the fibre channel specification has been described, however, the invention can be applied to a variety of communication in which a clock receiving data and a clock transmitting data are different.

Figure 11:
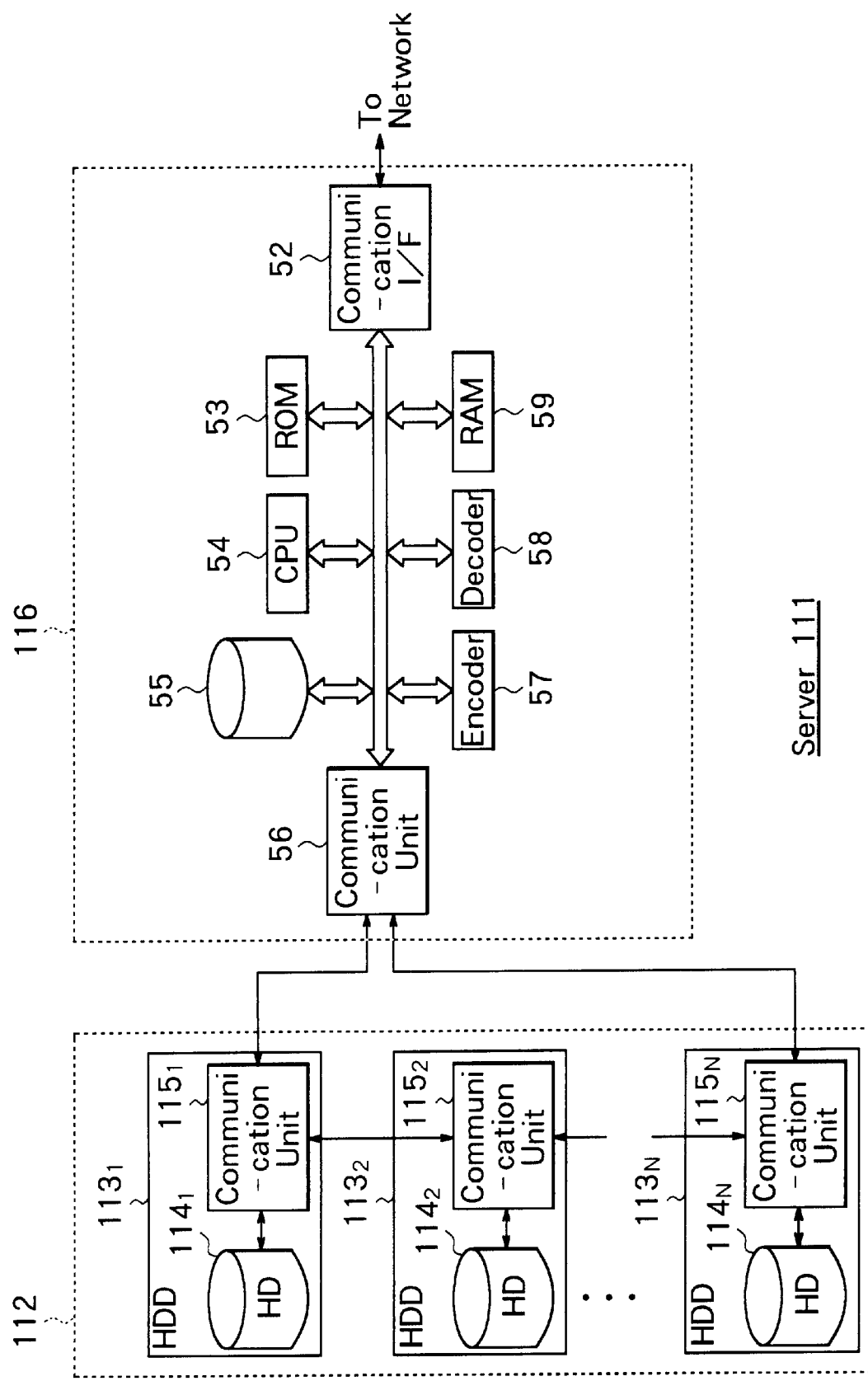
FIG. 11 is a block diagram showing a structural example of a server in the VOD system sown in FIG. 10.

In the embodiment shown in FIG. 11, the arbitrated loop topology is formed with the processing apparatus 116 and the disk array 112 having two or more HDD, however, the invention can be also applied to a case where the arbitrated loop topology is formed with two or more processing apparatus and an HDD, or a case where the arbitrated loop topology is formed with a plurality of the processing apparatus and a plurality of HDD.

Moreover, in the embodiment shown in FIG. 11, the program data is stored in an HD, however, the program data can be stored in other disk medium or a tape medium other than the disk medium.

The VOD system as an application example in which the invention is applied is described so far. Next, a sending out system of a program materials (here, including image and sound) mainly in a broadcasting station as another application example will be described.

Figure 12:
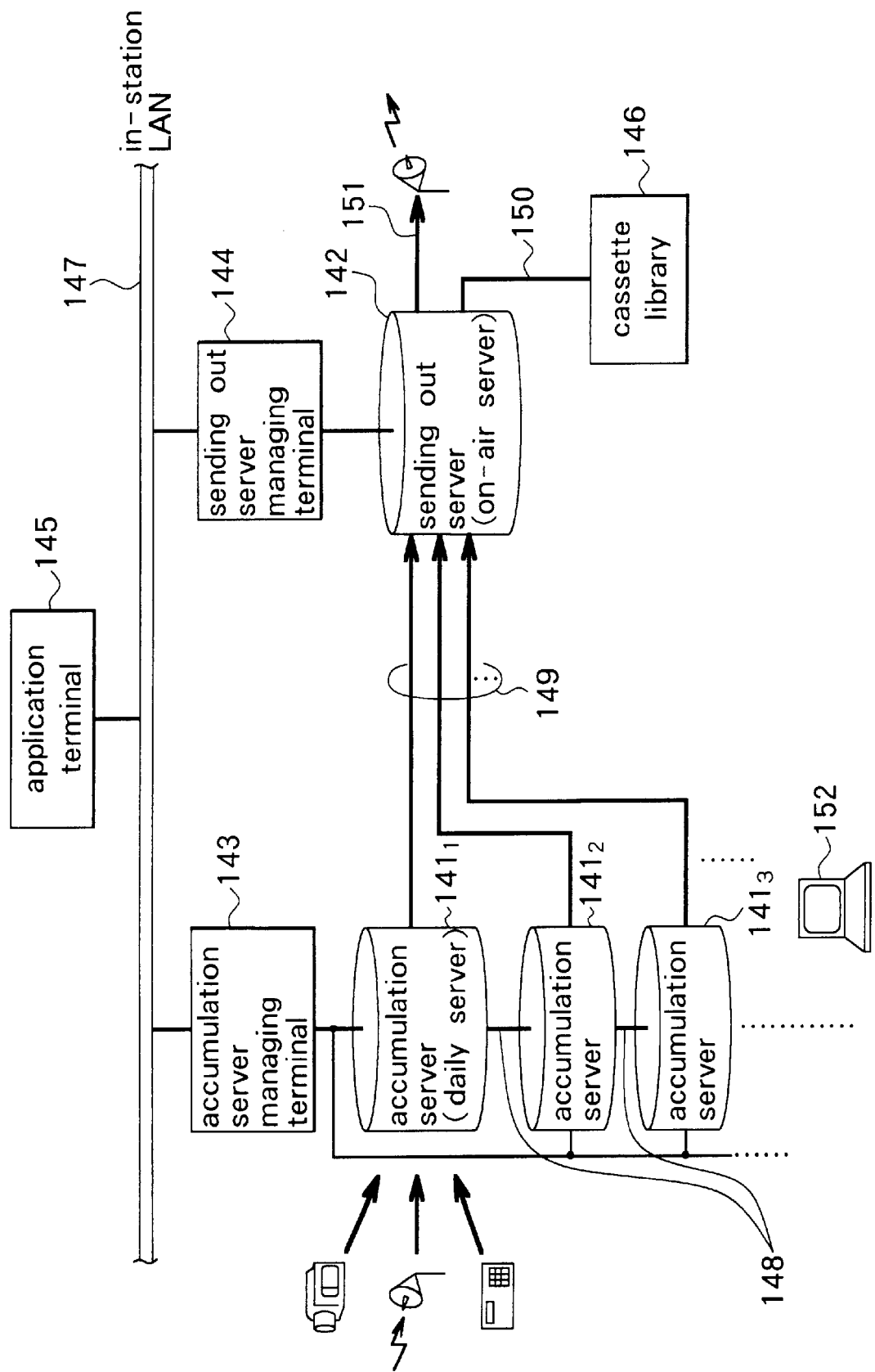
FIG. 12 is a block diagram showing a structural example of a transmitting system of program materials to which the invention is applied.

FIG. 12 shows a structural example of an embodiment in which the invention is applied.

The sending out system of the program materials mainly comprises accumulation servers (called also as daily server) $141_1$, $141_2$, . . . , formed like the above-mentioned server 111, the sending out server (called also as on-air server) 142, an accumulation-server-managing-terminal 143 for managing the accumulation servers $141_1$, $141_2$, . . . , a sending-out server-managing terminal 144 for managing the sending out terminal 142, an application terminal 145 for organizing programs, an in-station IAN 147 which connects the accumulation-server-managing-terminal 143, the sending-out-server-managing-terminal 144 and the application terminal 145, a cassette library 146 for accumulating the materials sent out from the sending out server 142, and a editing machine 152 for editing the program materials accumulated in the accumulation servers $141_1$, $141_2$, . . . .

An operation of the program sending out system formed as described will be described in the followings.

Data including image and sound data for programs taken from a camcorder (video camera), satellite broadcasting and VTR and so on by covering materials are first accumulated in the accumulation servers $141_1$, $141_2$, . . . . The accumulation-server-managing-terminal 143 manages what kind of materials are accumulated in the server. For example, program materials are managed in a file format.

The program materials accumulated in the accumulation servers $141_1$, $141_2$, . . . are edited in the editing machine 152, and the edited data is stored in the accumulation-server-managing-terminal 143. The data which is supposed to be managed in the accumulation-server-managing-terminal 143 can be taken out from the application terminal 145 connected via the in-station LAN 147, and become base data when planning programs in detail such as a starting time or title, and deciding the indication time of the title.

Materials which are to be sent out substantially are selected base on the construction of programs (also called program schedule) formed in the application terminal 145, and the selected materials are transferred from the accumulation servers $141_1$, $141_2$, . . . to the sending out server (on-air server) 142. The transferred materials are managed in the sending-out-server-managing-terminal 144. Here, what kind of materials are accumulated in the sending out server 142 in a file format is managed in the same manner as the accumulation-server-managing terminal 143.

The program materials are sent out from the sending out server 142 at a time mentioned in the program schedule formed in the application terminal 145.

The sending out server 142 accumulates only the materials actually used in a broadcasting and the accumulation servers $141_1$, $141_2$,. . . accumulates the materials covered in report and so on. Therefore, the sending out server 142 is formed with servers of smaller storage capacity than that of the accumulation servers $141_1$, $141_2$, . . . .

On the other hand, the accumulation servers $141_1$, $141_2$, . . . are required to have a large capacity, so that they are formed with a plurality of servers.

A system which bears an effective operation for a long time by the fibre channel to which the invention is applied along with the high-speed transferring function provided in the fibre channel can be built in a broadcasting station by connecting a connecting line 148 between a plurality of the accumulation servers $141_1$, $141_2$, . . . with the fibre channel to which the invention is applied.

Further, in addition to the connecting line 148 between the accumulation server $141_1$, $141_2$, . . . , a connecting line 149 between the accumulation server $141_1$, $141_2$, . . . and the sending out server 142 can build a system with the same effect as described by applying the invention. Moreover, from the sending out server 142 to the place in a station from which the materials are actually sent out may be connected by the fibre channel. Further, the same effect can be obtained when the buses to which materials before and after the servers are transferred are all built with the fibre channel.

In the above-mentioned example, it is described that the accumulation servers $141_1$, $141_2$, . . . and the sending out server 142 have the same construction with the server 111 shown in FIG. 11. However, for example, the accumulation server $141_1$, $141_2$, . . . may be a cassette auto changer formed with a plurality of cassettes and VTR, and the sending out server 142 may be formed with semiconductor memories such as DRAM or flush memory. In such a case, it is needless to say that they are required to have communication units (communication units 56, $115_1$, $115_2$, . . . shown in FIG. 11) for fibre channel communications respectively.

Next, an example of another sending out system of program materials will be described.

Figure 13:
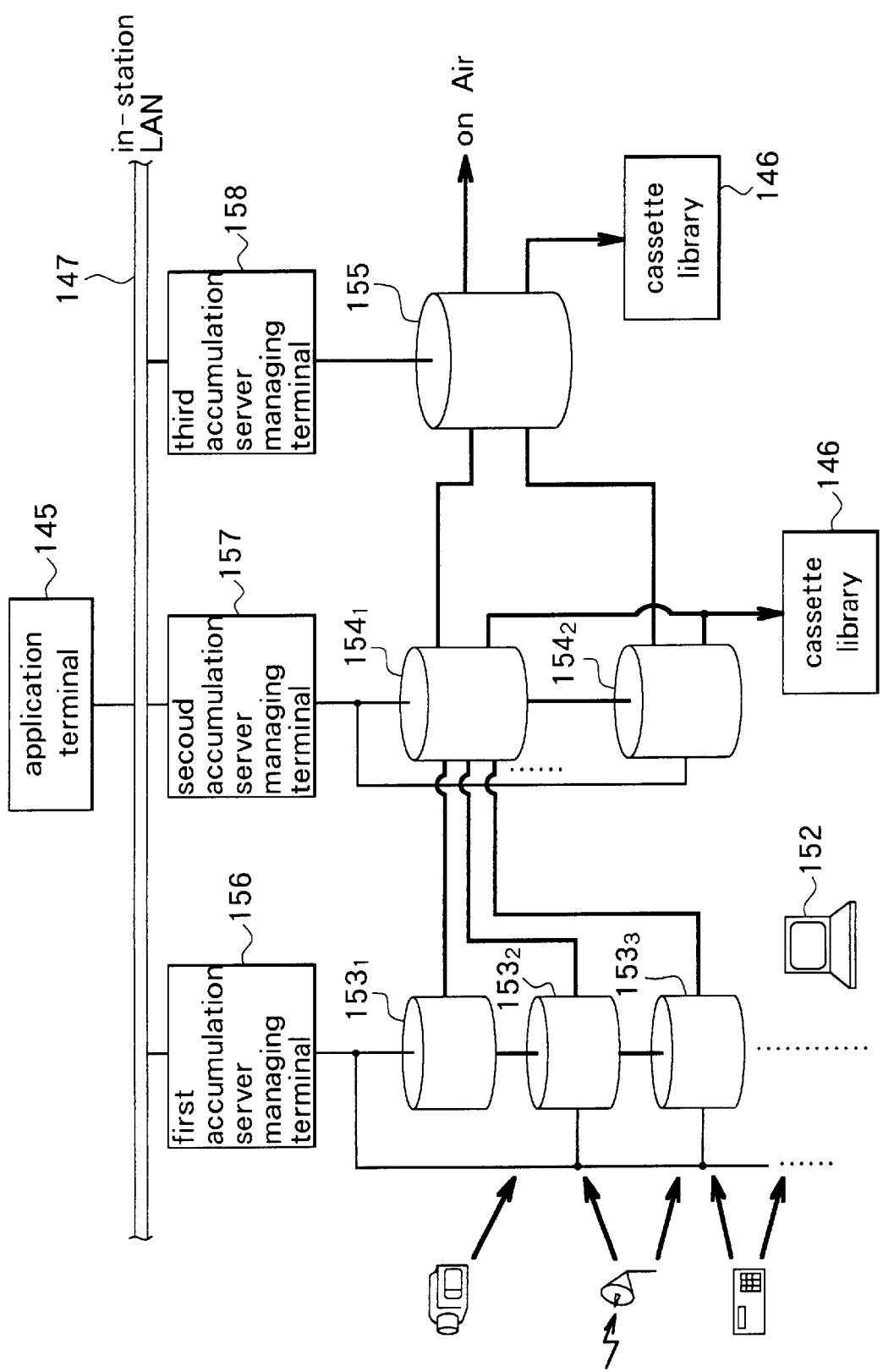
FIG. 13 is a block diagram showing another structural sample of a transmitting system of program materials to which the invention is applied.

FIG. 13 shows a structural example of an embodiment to which the invention is applied.

The sending out system shown in FIG. 13 mainly comprises a first accumulation servers $153_1$, $153_2$, . . . for accumulating program materials, a second accumulation servers $154_1$, $154_2$, . . . having a smaller storage capacity than the first accumulation servers $153_1$, $153_2$, . . . , a third accumulation server 155 for sending out having a smaller storage capacity than the second accumulation servers $154_1$, $154_2$, . . . , a first accumulation-server-managing-terminal 156, a second accumulation-server-managing-terminal 157, a third accumulation-server-managing-terminal 158, and an application terminal 145 which is connected to the managing terminals via the in-station LAN 147.

In the case of the embodiment, a cassette auto changer having a plurality of cassettes and VTR is used as the first accumulation servers $153_1$, $153_2$, . . . , and the server 111 described with reference to FIG. 11 is used as the second accumulation servers $154_1$, $154_2$, . . . and the third accumulation server 155.

Here, a system which can bear an effective operation for a long time along with the high-speed transferring function provided in the fibre channel can be built in a broadcasting station by connecting between a plurality of servers $153_1$, $153_2$, . . . which are the servers having the greatest storage capacity with the fibre channel to which the invention is applied. When the first accumulation servers $153_1$, $153_2$, . . . are used as cassette auto changers, it is needless to say, although not shown in the figure, that communication units for the fibre channel are required to be provided in the cassette auto changers.

Further, the same effect can be obtained when the among the second accumulation servers $154_1$, $154_2$, . . . , among these three servers, and all the buses to which materials in a broadcasting station including the servers are transferred are connected with the fibre channel to which the invention is applied.

Next, an example of another sending out system of program materials will be described.

Figure 14:
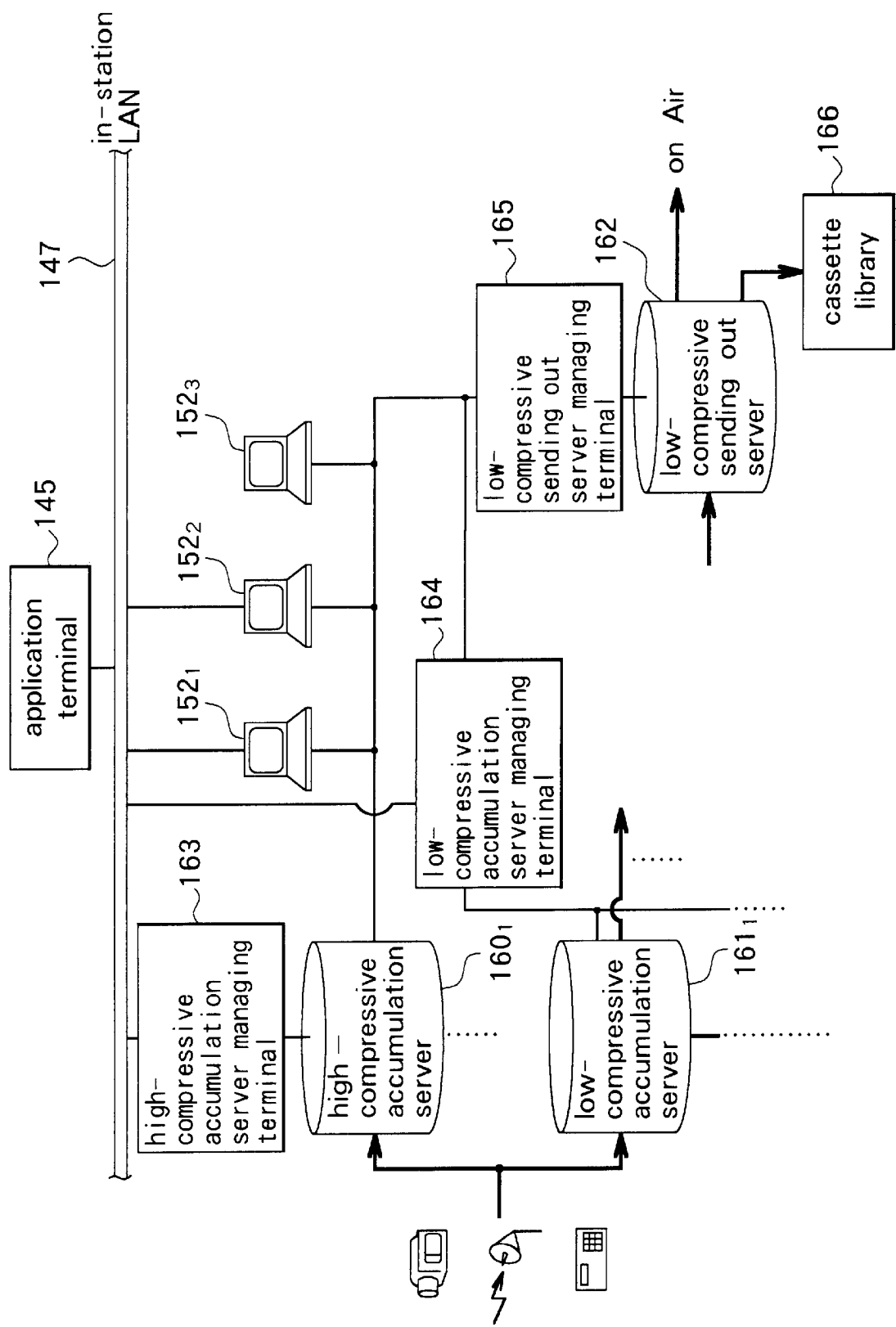
FIG. 14 is a block diagram showing still another structural sample of a transmitting system of program materials to which the invention is applied.

FIG. 14 shows a structural example of an embodiment to which the invention is applied.

The sending out system shown in FIG. 14 comprises mainly high-compressive accumulation servers $160_1$, . . . which are same with the server 111, a low-compressive-accumulation server $161_1$, . . . , a low-compressive sending-out server 162, a managing terminal for a high-compressive accumulation server 163, a managing terminal for a low-compressive accumulation server 164, and a managing terminal for a low-compressive accumulation-sending-out server 165.

In the embodiment, inputted materials are accumulated in two servers, the high-compressive accumulation servers $160_1$ . . . and the low-compressive accumulation servers $161_1$, . . . , which are respectively formed with a high-compressive system and a low-compressive system.

The high-compressive system is a system which mainly edits materials accumulated in a plurality of editing machines $152_1$, $152_2$, . . . and the quality (such as high quality of pictures) of the materials are not regarded. Therefore, the inputted material is high-compressed so as to decrease the large capacitance of the high-compressive accumulation servers $160_1$, . . . .

In the low-compressive system, materials compressed in the low-compressive accumulation servers $161_1$, . . . based on the editing data edited in the high-compressive system are transferred to a low-compressive sending-out server 162 and the materials are sent out from the low-compressive sending-out server 162 based on the program schedule formed in the application terminal 145.

In the program sending out system formed as described, a large capacitance can be easily obtained and a system which can conduct a effective operation for a long time with high-speed transferring can be built by connecting each server with the fibre channel to which the invention is applied, like the embodiment described above.

According to the invention as described above, communication bits corresponding to a plurality of communication ports are added to a command which orders to open the communication ports. Among a plurality of the bits, only the ones corresponding to the communication ports which are to be opened are transmitted being set to a predetermined value so that a plurality of ports can be opened in a short time.

Further, according to the invention, input information is stored synchronizing with the first clock and the stored information is read out synchronizing with the second clock. Therefore, even when the first clock and the second clock are asynchronous, information can be effectively transmitted.

Regarding the invention, it is evident that different embodiments in a broad range can be constructed based on the invention without departing from the spirit and range of the invention. The invention is not limited to specific embodiments except that it is specified in a range of the attached claims.

As described, the data communication apparatus and the method, and the data recording/reproducing apparatus and the method can be preferably used in, for example, a communication field based on a specification of the fibre channel. Further, the invention can be preferably used in such as the VOD or a sending-out system of program materials in a broadcasting station.

What is claimed is:

1. A data communication apparatus for opening and transmitting data to at least one of a plurality of communication ports, comprising:

transmitting means for providing an address region showing addresses corresponding to the plurality of the communication ports respectively in a command for opening the communication ports, wherein each said address has a corresponding data, and for transmitting the command to the plurality of the communication ports with the data of the address of at least one select communication port which is to be opened being set a first predetermined value;

receiving means for receiving the command transmitted back from the plurality of the communication ports and determining whether the at least one select communication port is opened based on the data being set a second predetermined value in the address of the at least one select communication port in the address region of the command for opening the communication ports;

wherein the select communication port becomes opened by the first predetermined value in the command transmitted from the transmitting means and data is transmitted to the select communication port opened.

2. A data communication apparatus according to claim 1 wherein:

the transmitting means is formed to transmit data including the command; and transmitting means of the one of the communication ports and the receiving means of the data communication apparatus are connected and the transmitting means of the data communication apparatus and receiving means of the one of the communication ports are connected.

3. A data communication apparatus according to claim 2 further comprising an open processing means for enabling the at least one select communication port to open for receiving data from the data communication apparatus by altering the first predetermined value to the second predetermined value when the command for opening the communication port is received by the receiving means of the select communication port and the first predetermined value of an address region of the command is the value corresponding to an address of the select communication port.

4. A data communication apparatus according to claim 3 wherein the select communication port does not alter the first predetermined value when receiving the data from the data communication apparatus is not possible even if the first predetermined value of the address region of the command received by the receiving means of the select communication port is the value corresponding to the address of the select communication port.

5. A data communication apparatus according to claim 2 wherein the transmitting means of the data communication apparatus transmits synchronous data for synchronizing reception of the data by the receiving means of the data communication apparatus and transmission of the data by the transmitting means of the data communication apparatus by adding the synchronous data to the command.

6. A data recording/reproducing apparatus connected to at least one other data recording/reproducing apparatus comprising:

a non-linear accessible recording medium, input/output processing means for processing data so that at least one of recording and reproducing of data to a recording medium is performed, and communication means for receiving and transmitting data wherein:

after having communication means of the other data recording/reproducing apparatus opened, the data recording/reproducing apparatus transmits data to the opened communication means of the other data recording/reproducing apparatus;

the communication means of the data recording/reproducing apparatus comprises transmitting means for providing an address region showing addresses corresponding to communication means of other data recording/reproducing apparatus respectively in a command for opening the communication means of the other data recording/reproducing apparatus wherein each of said address has a corresponding data, and for transmitting the command to the communication means of the other data recording/reproducing apparatus with the data of the address of the communication means of at least one select data recording/reproducing apparatus of the other data recording/reproducing apparatus which are to be opened being set a first predetermined value; and receiving means for receiving the command transmitted back from the communication means of the other data recording/reproducing apparatus, and determining whether the at least one select data recording/reproducing apparatus is opened based on the data being set a second predetermined value in the address of the at least one select communication port in the address region of the command for opening the communication means;

communication means of the select data recording/reproducing apparatus is opened by the first predetermined value in the command transmitted from the transmitting means of the data recording/reproducing apparatus and data is transmitted to the opened communication means of the select data recording/reproducing apparatus.

7. A data recording/reproducing apparatus according to claim 6 wherein:

the transmitting means is formed to transmit data including the command; and transmitting means of the communication means of the other recording/reproducing apparatus and the receiving means of the data recording/reproducing apparatus are connected, and the transmitting means of the data recording/reproducing apparatus and receiving means of the communication means of the other recording/reproducing apparatus are connected.

8. A data recording/reproducing apparatus according to claim 7 further comprising open processing means for opening the communication means of the select recording/reproducing apparatus by having the select recording/reproducing apparatus alter the first predetermined value to the second predetermined value in the command when the command is received by the receiving means of the select recording/reproducing apparatus and the first predetermined value of the command corresponds to the address of the select recording/reproducing apparatus.

9. A data recording/reproducing apparatus according to claim 8 wherein the transmitting means of the data recording/reproducing apparatus transmits a synchronous data for synchronizing with reception of the data by receiving means of the data recording/reproducing apparatus and transmission of the data by the transmitting means of the data recording/reproducing apparatus by adding the synchronous data to the command.

10. A data communication method for opening and transmitting data to a plurality of communication ports from a data communication apparatus, including:
    providing an address region showing addresses corresponding to the plurality of communication ports in a command for opening the communication ports wherein each said address has a corresponding data, and for transmitting the command to a plurality of the communication ports with the data of the address of at least one select communication port which is to be opened being set a first predetermined value; and
    receiving the command transmitted back from the plurality of the communication ports and determining whether the at least one select communication port is opened based on the data being set a second predetermined value in the address of the at least one select communication port in the address region of the command for opening the communication ports; and
    transmitting data to the communication port opened.

11. A data communication method according to claim 10 wherein:
    transmitting means of one of the plurality of communication ports and the receiving means of the data communication apparatus are connected, and the transmitting means of the data communication apparatus and receiving means of the one of the plurality of communication port are connected.

12. A data communication method according to claim 11 further including an open processing step for enabling the select communication port to open the communication port for receiving data from the data communication apparatus by altering the first predetermined value to the second predetermined value when the command is received by the receiving means of the select communication port and the first predetermined value of an address region of the command is the value corresponding to an address of the select communication port.

13. A data communication method according to claim 12 wherein the select communication port does not alter the first predetermined value when receiving the data from the data communication apparatus is not possible even if the first predetermined value of the address region of the command received by the receiving means of the select communication port is the value corresponding to the address of the select communication port.

14. A data communication method according to claim 11 wherein the transmitting means of the communication apparatus transmits synchronous data for synchronizing reception of the data by the receiving means of the data communication apparatus and transmission of the data by the transmitting means of the data communication apparatus by adding the synchronous data to the command in the first step.

15. A data recording/reproducing method for transmitting data to an opened communication means of at least one select data recording/reproducing apparatus, and recording and reproducing data to/from a recording medium of the select data recording/reproducing apparatus after having the communication means of the select data recording/reproducing apparatus opened, in a data recording/reproducing apparatus comprising a non-linear accessible recording medium, input/output processing means for processing data so that at least one of recording and reproducing of data to the recording medium is performed and communication means for receiving and transmitting data, including:
    a step in which an address region showing addresses corresponding to each communication means of the other data recording/reproducing apparatus is provided in a command for opening the communication means of the other data recording/reproducing apparatus wherein each of said address has a corresponding data, and the command is transmitted to the communication means of the other data recording/reproducing apparatus with the data of the address of the communication means of the select data recording/reproducing apparatus which is to be opened being set a predetermined value; and
    a step in which the command transmitted back from the communication means of the other data recording/reproducing apparatus is received to determine whether the communication means of the select data recording/reproducing apparatus is opened based on the data being set a second predetermined value in the address of the at least one select communication means in the address region of the command for opening the communication means of the select data recording/reproducing apparatus, and transmitting data to the communication means of the select data recording/reproducing apparatus which is opened.

16. A data recording/reproducing method according to claim 15 wherein:
    transmitting means for transmitting the data including the command and receiving means for receiving the data including the command transmitted from the communication means of the other recording/reproducing apparatus are provided in the communication means of the data recording/reproducing apparatus; and
    transmitting means of the communication means of one of the other recording/reproducing apparatus and the receiving means of the data recording/reproducing apparatus are connected, and the transmitting means of the data recording/reproducing apparatus and receiving means of the communication means of the one of the other recording/reproducing apparatus are connected.

17. A data recording/reproducing method according to claim 16 further including open processing step for opening the communication means of the select recording/reproducing apparatus by altering the first predetermined value of the command to the second predetermined value when the command is received by the receiving means of the select recording/reproducing apparatus and the first predetermined value of the command corresponds to the address of the select recording/reproducing apparatus.

* * * * *